(12) United States Patent
Gupta et al.

(10) Patent No.: US 12,333,456 B2
(45) Date of Patent: Jun. 17, 2025

(54) DECENTRALIZED PARKING FULFILLMENT SERVICE

(71) Applicants: Toyota Jidosha Kabushiki Kaisha, Toyota (JP); Toyota Motor Engineering & Manufacturing North America, Inc., Plano, TX (US)

(72) Inventors: Rohit Gupta, Mountain View, CA (US); Nejib Ammar, Mountain View, CA (US); Prashant Tiwari, Mountain View, CA (US)

(*) Notice: Subject to any disclaimer, the term of this patent is extended or adjusted under 35 U.S.C. 154(b) by 211 days.

(21) Appl. No.: 17/848,723

(22) Filed: Jun. 24, 2022

(65) Prior Publication Data

US 2023/0419200 A1    Dec. 28, 2023

(51) Int. Cl.
*G06Q 10/047* (2023.01)
*H04W 4/40* (2018.01)

(52) U.S. Cl.
CPC ....... *G06Q 10/047* (2013.01); *G06Q 2240/00* (2013.01); *H04W 4/40* (2018.02)

(58) Field of Classification Search
CPC .................................................. G06Q 10/047
USPC .......................................................... 705/13
See application file for complete search history.

(56) References Cited

U.S. PATENT DOCUMENTS

| 10,755,570 | B1 * | 8/2020 | Zhou ................ B62D 15/0285 |
| 11,287,829 | B2 * | 3/2022 | Johnston ............. G05D 1/0214 |
| 11,425,530 | B2 * | 8/2022 | Hayes ................... H04W 4/029 |
| 2019/0043083 | A1 * | 2/2019 | Ornstein ................ G06Q 10/04 |
| 2019/0088128 | A1 * | 3/2019 | Adireddy ........... G06Q 30/0284 |

(Continued)

FOREIGN PATENT DOCUMENTS

| CN | 110525428 B | 9/2020 |
| CN | 112068515 A | 12/2020 |

(Continued)

OTHER PUBLICATIONS

"Decentralized Hybrid Neural Networks," by Uri Yerushalmi, Apr. 11, 2018 (Year: 2018).*

(Continued)

*Primary Examiner* — Jeff Zimmerman
*Assistant Examiner* — Brian Adams Heflin
(74) *Attorney, Agent, or Firm* — Burbage Law, P.C.; Jon-Michael Burbage

(57) ABSTRACT

In some implementations, a method for providing a decentralized parking fulfillment service may include executing, by a first processor of a connected computing device, a first artificial intelligence network. In addition, the decentralized parking fulfillment service may include executing, by a second processor of a connected vehicle, a second artificial intelligence network. The decentralized parking fulfillment service may include providing the decentralized parking fulfillment service including solving, by the first artificial intelligence network and the second artificial intelligence network, a function that determines a parking space for the connected vehicle. In some implementations, a decentralized parking fulfillment system for providing the decentralized parking fulfillment system includes a parking lot agent stored in a first non-transitory memory of the connected computing device and a vehicle parking agent stored in a second non-transitory memory of the connected vehicle.

20 Claims, 10 Drawing Sheets

(56) References Cited

U.S. PATENT DOCUMENTS

2020/0258386 A1* 8/2020 Lu .................. G06Q 10/02
2021/0133603 A1 5/2021 Zhu et al.

FOREIGN PATENT DOCUMENTS

CN 112419775 A 2/2021
CN 111645673 B 5/2021

OTHER PUBLICATIONS

"Improving Parking Availability Information Using Deep Learning Techniques," by Jamie Arjona, M. Paz Linares, Josep Casanovas-Garcia, and Juan Jose Vazquez, Sep. 18-20, 2019 (Year: 2019).*

"Deep Learning for decentralized parking lot occupancy detection," by Giuseppe Amato, Fabio Carrara, Fabrizio Falchi, Claudio Gennaro, Carlo Meghini, and Claudio Vairo, Oct. 29, 2016 (Year: 2016).*

"Collaborative Autonomous Driving—A survey of Solution Approaches and Future Challenges," by Sumbal Malik, Manzoor Ahmed Khan, and Hesham El-Sayed, May 29, 2021 (Year: 2021).*

"Park my Car! Automated Valet Parking with Different Vehicle Automation Levels by V2X Connected Smart Infrastructure," by Philip Schorner, Marcus Conzelmann, tobias Fleck, Marc Zofka, and J. Marius Zollner, Sep. 19-21, 2021 (Year: 2021).*

Khalid, et al., "A Reinforcement Learning based Path Guidance Scheme for Long-range Autonomous Valet Parking in Smart Cities," https://ieeexplore.ieee.org/document/9306103, Oct. 2020, 7 pages.

Nguyen, et al., "Vacant Parking Space Detection based on Task Consistency and Reinforcement Learning," https://ieeexplore.ieee.org/document/9412152, Jan. 2021, 8 pages.

Özelŏglu, et al., "SoC Architecture of Autonomous Parking with RL-based Neural Network Compute Accelerators," Proceedings of the 2020 Ulusal Yüksek Basar?ml? Hesaplama Konferans?, BA S, ARIM2020 (202), 6 pages.

* cited by examiner ( Figure 3B )

↓

Further comprise the connected computer device and the connected vehicle wireless communicating with one another via wireless communication to solve the function
326

Figure 3C

Goals: The goal is to match cost of parking spaces $O_v$ and future requests $W_v$ for every vehicle $v$:

$$\sum_p \sum_{s \in Sp} T_{ps} + \sum_{r \in Rok} T_r + C_M$$

where:

$p$ and $s$ are the parking lot and parking space resopectively,
$T_{ps} < \emptyset$, is the delay to park in parking lot and parking space s $T_r$ is the requested scheduled parking delay
$C_M$ is personal preference matching cost including penalty for not fulfilling a request
$\emptyset$ is constant delay threashold

Figure 4

DECENTRALIZED PARKING FULFILLMENT SERVICE

BACKGROUND

The specification relates to providing a decentralized parking fulfillment service. More specifically, some embodiments relate to providing a decentralized parking fulfillment service for one or more parking lots and one or more vehicles.

Modern vehicles broadcast vehicle-to-everything (V2X) messages that include digital data describing their locations, speeds, headings, past actions, and future actions, etc. Vehicles that broadcast V2X messages are referred to as "V2X transmitters." Vehicles that receive the V2X messages are referred to as "V2X receivers." The digital data that is included in the V2X messages can be used for various purposes including, for example, the proper operation of Advanced Driver Assistance Systems (ADAS systems) or autonomous driving systems which are included in the V2X receivers.

Modern vehicles include ADAS systems or automated driving systems. An automated driving system is a collection of ADAS systems which provides sufficient driver assistance that a vehicle is autonomous. ADAS systems and automated driving systems are referred to as "vehicle control systems." Other types of vehicle control systems are possible. A vehicle control system includes code and routines, and optionally hardware, which are operable to control the operation of some or all of the systems of a vehicle.

A particular vehicle that includes these vehicle applications is referred to herein as a "connected vehicle" or an "ego vehicle." Other vehicles in the vicinity of the connected vehicle are referred to as "remote vehicles."

SUMMARY

There are thousands of parking lots in the world. Finding a parking space within a parking lot is complicated and aggravating. Parking lot operators are benefit from helping vehicles to identify available parking spaces within parking lots. Vehicles and parking lot operations are improved by a distributed parking fulfillment system that leverages sensor technologies and V2X communications to identify one or more available parking spaces and notify vehicle operators about the availability of the one or more parking spaces.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include executing, by a first processor of a connected computing device, a first artificial intelligence network. The method may also include executing, by a second processor of a connected vehicle, a second artificial intelligence network. The method may furthermore include providing the decentralized parking fulfillment service including solving, by the first artificial intelligence network and the second artificial intelligence network, a function that determines a parking space for the connected vehicle. Other embodiments of this aspect include corresponding computer systems, apparatus, and computer programs recorded on one or more computer storage devices, each configured to perform the actions of the methods.

Implementations may include one or more of the following features. The method where the connected computing device includes an edge server. The method where the computing device includes a roadside unit. The method where one or more of the first intelligence network and the second intelligence network includes a neural network. The method where the function includes a cost function. The method may include providing a notification to the connected vehicle describing the parking space. The method where the first artificial intelligence network is included in a parking lot agent that is operable to solve the function based on a first set of parameters prioritized by an operator of a parking lot that includes the parking space. The method where the first artificial intelligence network is stored in a first non-transitory memory of the connected computing device. The method where the second artificial intelligence network is included in a vehicle agent that is operable to solve the function based on a second set of parameters prioritized by a driver of the connected vehicle. The method where the second artificial intelligence network is stored in a second non-transitory memory of the connected vehicle. The method may include the connected computer device and the connected vehicle wireless communicating with one another via wireless communication to solve the function. Implementations of the described techniques may include hardware, a method or process, or a computer tangible medium.

In one general aspect, a non-transitory computer program product may include executing, by the processor, a first artificial intelligence network. The non-transitory computer program product may also include executing, by the onboard unit, a second artificial intelligence network. The non-transitory computer program product may further include solving, by the first artificial intelligence network and the second artificial intelligence network, a function that determines a parking space for the connected vehicle. The non-transitory computer program product may in addition include providing a notification to the connected vehicle describing the parking space responsive to solving the function. Other embodiments of this aspect include corresponding computer systems, apparatus, and computer programs recorded on one or more computer storage devices, each configured to perform the actions of the methods.

Implementations may include one or more of the following features. The non-transitory computer program product where the connected computing device includes an edge server. The non-transitory computer program product where the computing device includes a roadside unit. The non-transitory computer program product where one or more of the first intelligence network and the second intelligence network includes a neural network. The non-transitory computer program product where the function includes a cost function. The non-transitory computer program product where the notification is provided via an interface of the connected vehicle to a driver of the connected vehicle. The non-transitory computer program product where the first artificial intelligence network is included in a parking lot agent that is operable to solve the function based on a first set of parameters prioritized by an operator of a parking lot that includes the parking space. The non-transitory computer program product where the second artificial intelligence network is included in a vehicle agent that is operable to solve the function based on a second set of parameters prioritized by a driver of the connected vehicle. Implementations of the described techniques may include hardware, a method or process, or a computer tangible medium.

In one general aspect, a distributed system may include a first processor of a connected computing device communicatively coupled a first communication unit and a first non-transitory memory. The distributed system may also include a second processor of a connected vehicle communicatively coupled to a second communication unit and a second non-transitory memory. The distributed system may further include the first processor being operable to retrieve first computer-executable code from the first non-transitory memory and execute the first computer-executable code. The distributed system may in addition include the second processor being operable to retrieve second computer-executable code from the second non-transitory memory and execute second computer-executable code. The distributed system may moreover include where the first processor and the second processor being operable to wirelessly communicate with one another during the execution of the first computer-executable code and the second computer-executable code using the first communication unit and the second communication unit so that the first processor and the second processor are communicatively coupled to one another. The distributed system may also include the execution of the first computer-executable code and the second computer-executable code being operable to cause the first processor and the second processor to execute steps including: executing, by the first processor, a first artificial intelligence network; executing, by a second processor, a second artificial intelligence network; and solving, by the first artificial intelligence network and the second artificial intelligence network, a function that determines a parking space for the connected vehicle. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

FIGS. 3A, 3B, and 3C are a flowchart of an example method for decentralized parking fulfillment service according to some embodiments.

FIG. 4 is a block diagram illustrating a function according to some embodiments.

DETAILED DESCRIPTION

Figure 1:
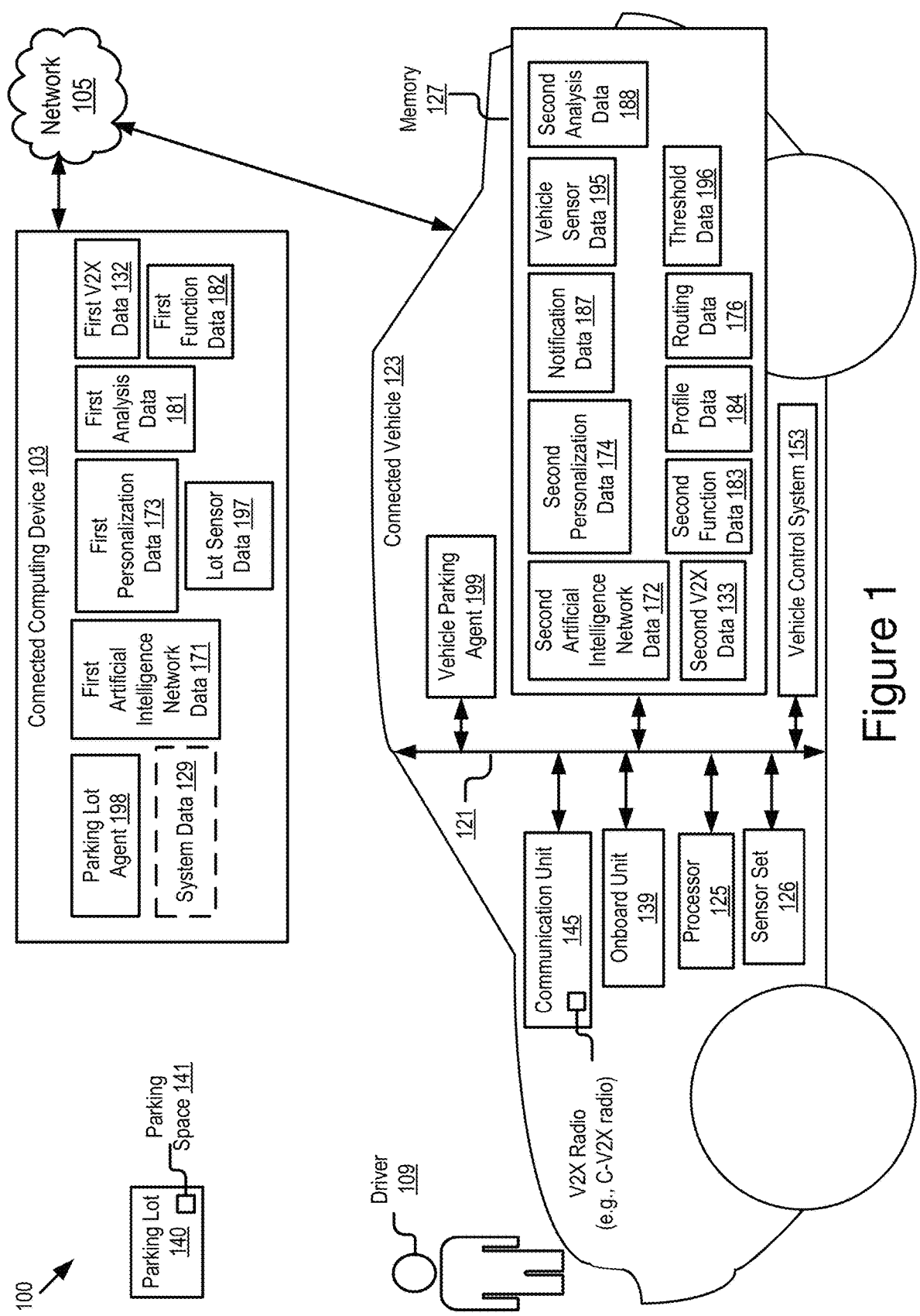
FIG. 1 is a block diagram illustrating an operating environment for a decentralized parking fulfillment system according to some embodiments.
Figure 2A:
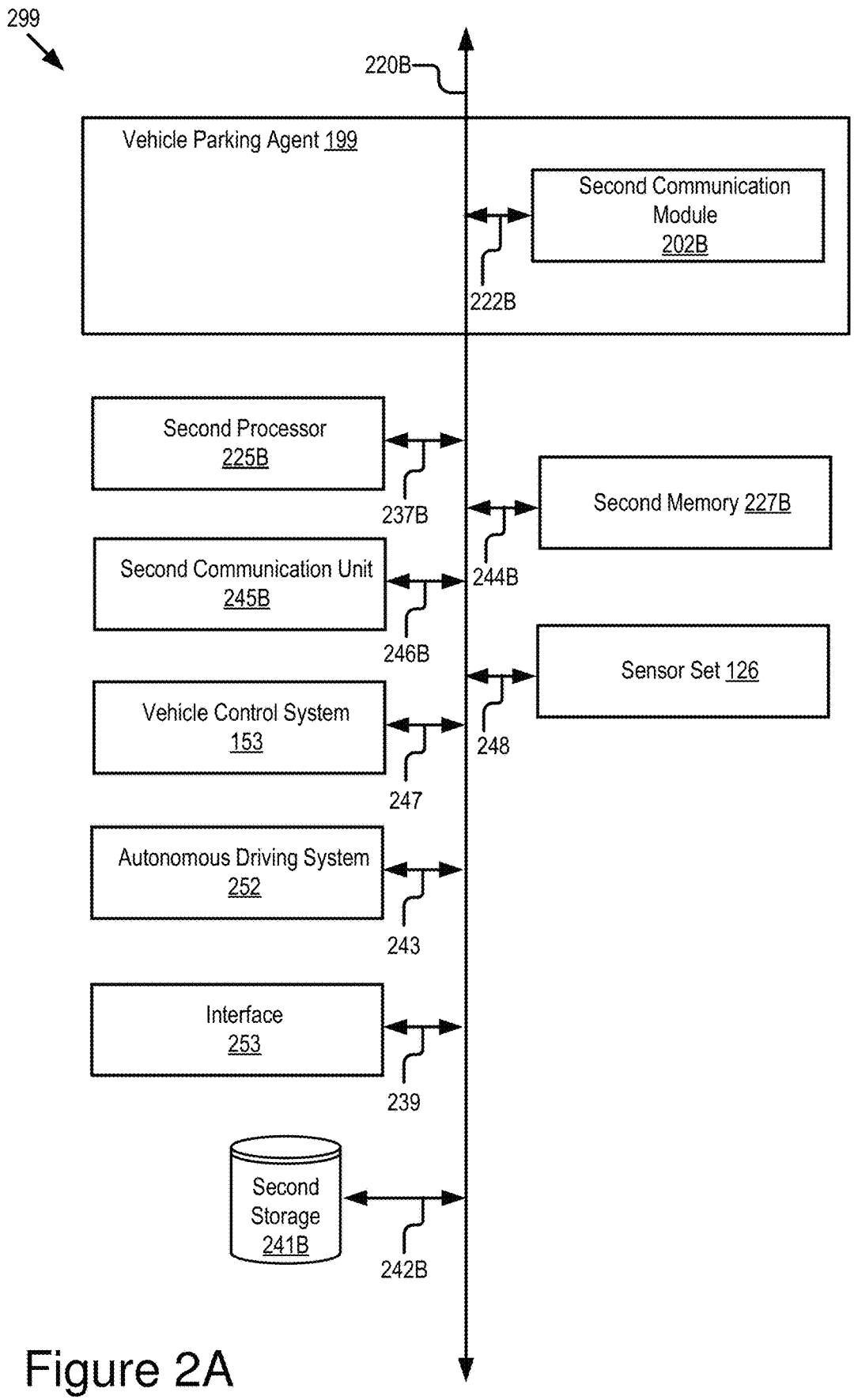
FIG. 2A is a block diagram illustrating an example computer system including a vehicle parking agent according to some embodiments.
Figure 2B:
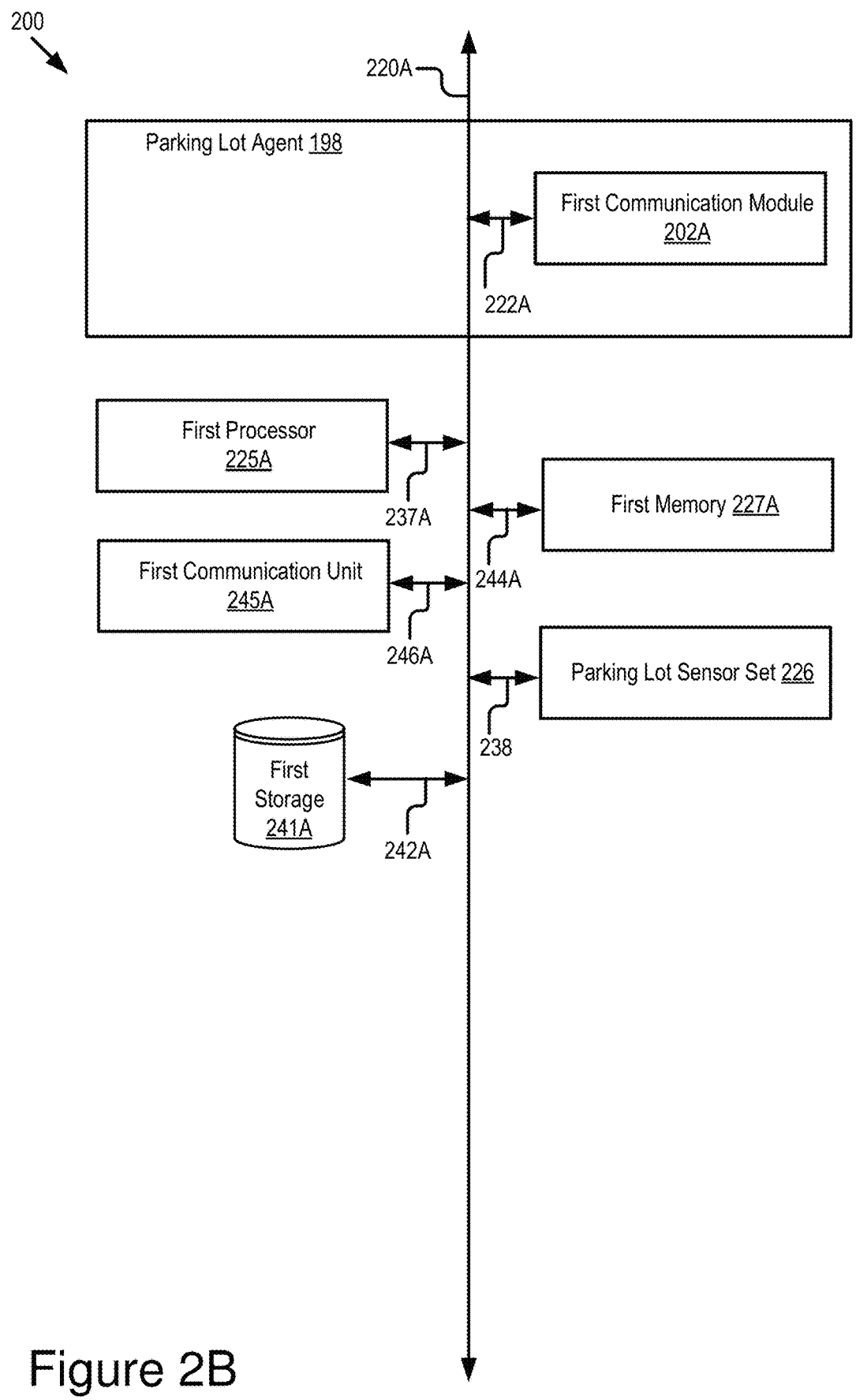
FIG. 2B is a block diagram illustrating an example computer system including a parking lot agent according to some embodiments.
Figure 7:
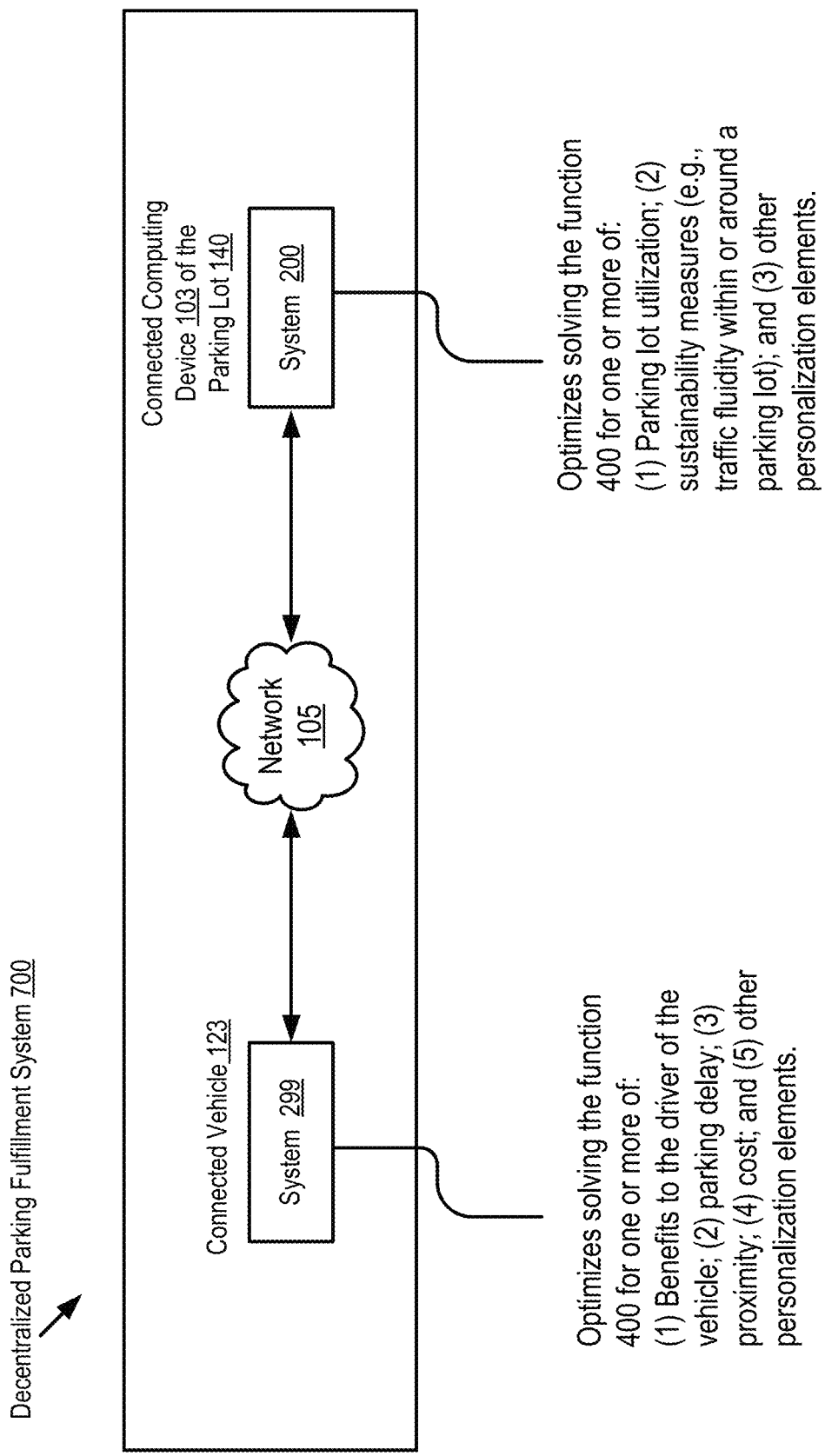
FIG. 7 is a block diagram illustrating an example of a decentralized parking fulfillment system according to some embodiments.

Described herein are embodiments of a decentralized parking fulfillment system. FIG. 7 depicts an example of the decentralized parking fulfillment system 700 according to some embodiments. As depicted, the decentralized parking fulfillment system 700 includes a system 200 (as depicted in FIG. 2A) communicatively coupled to a system 299 (as depicted in FIG. 2B) via a network 105 (as depicted in FIG. 1). These elements are described in more detail below.

Figure 3A:
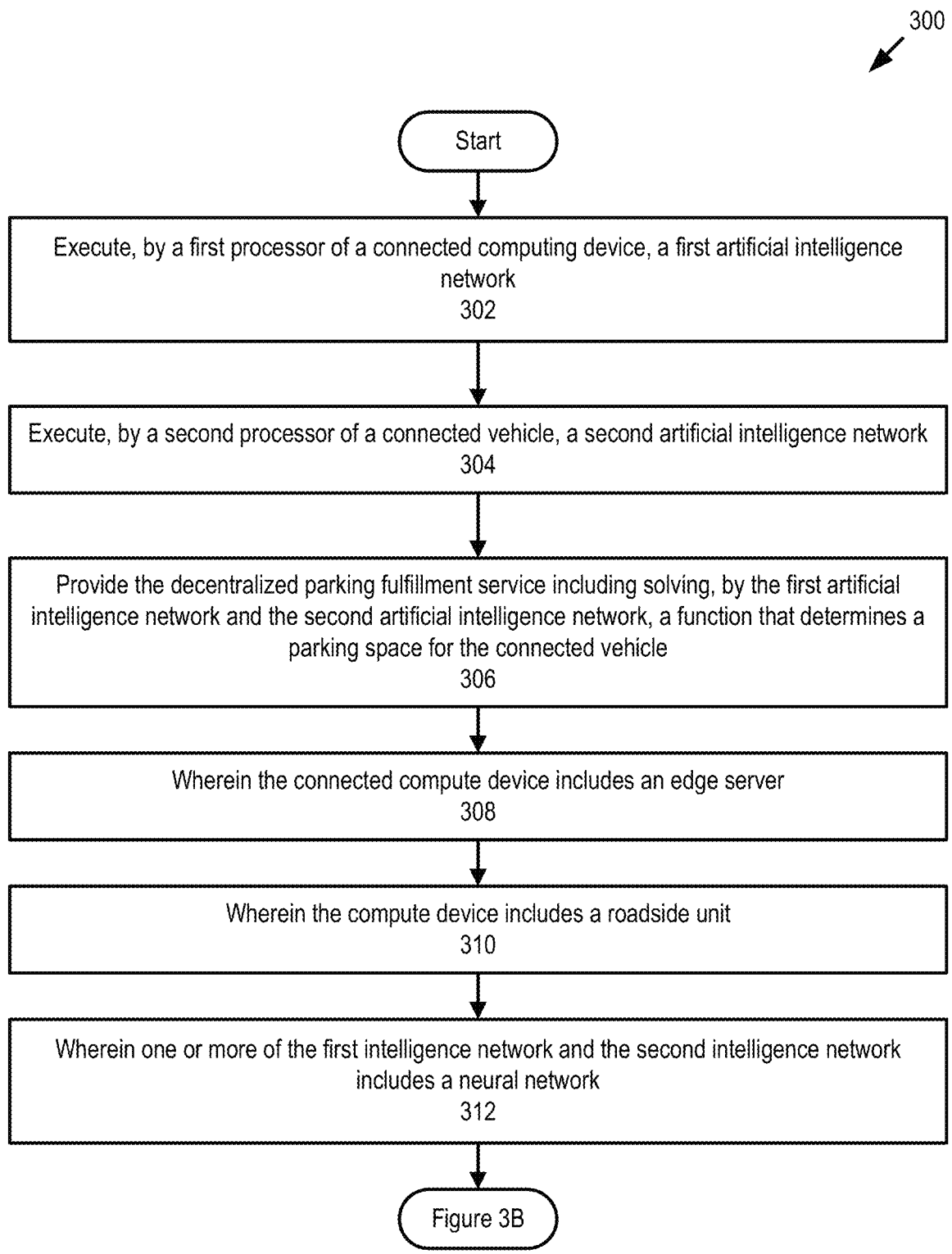
Figure 3B:
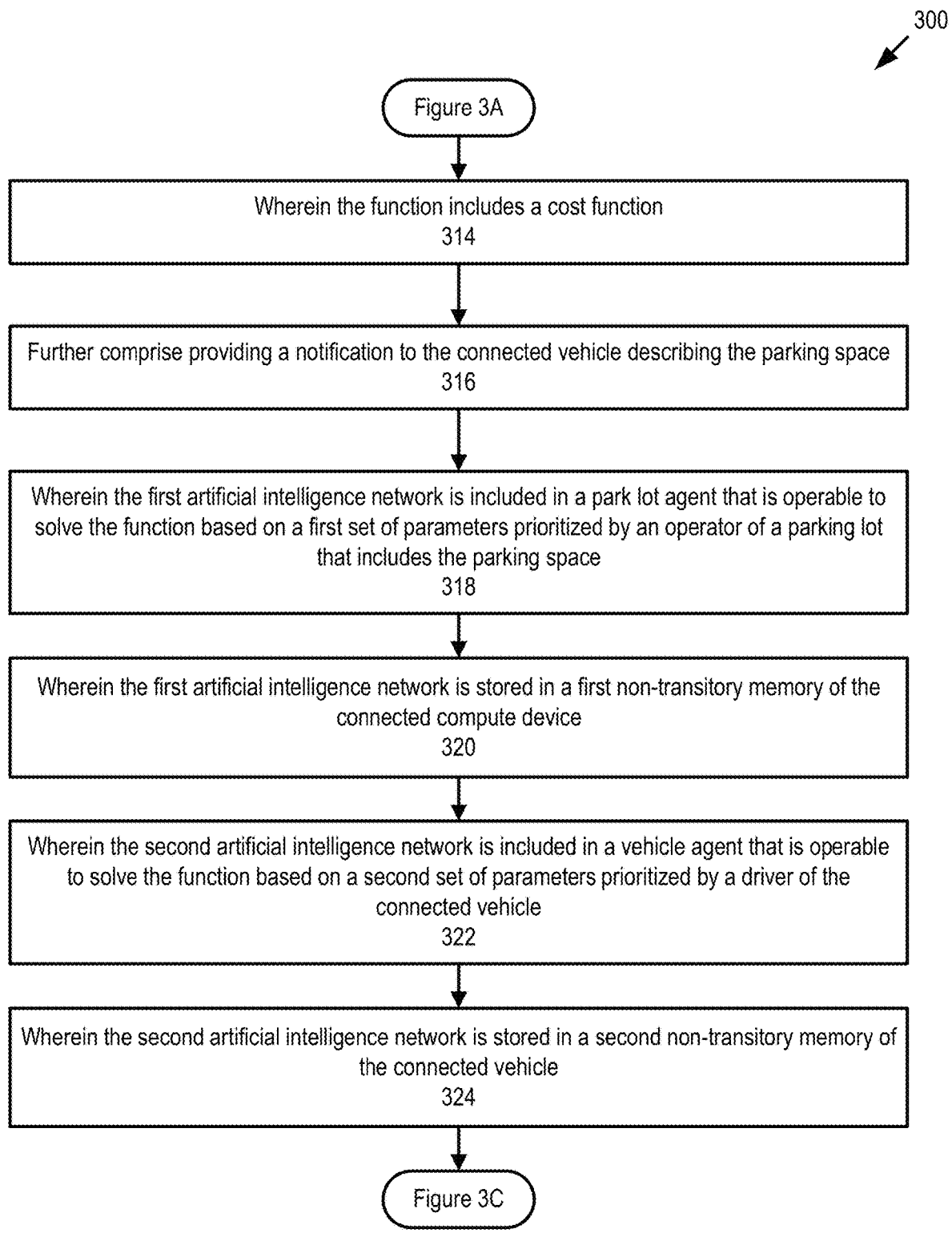

In some embodiments, the decentralized parking fulfillment system 700 is operable, when executed by a first processor (see, e.g., FIG. 2A) of a connected computing device 103 and a second processor (see, e.g., FIG. 2B) of a connected vehicle 123, to cause the first processor and the second processor to execute code and routines that are operable to provide a distributed parking fulfillment service, an example of which includes the method 300 described and depicted with reference to FIGS. 3A-3B, when executed by the first processor and the second processor. For example, the first processor has access to a parking lot agent. The second processor has access to a vehicle parking agent. The parking lot agent includes a first instance of some or all of the code and routines that provide the distributed parking fulfillment service. The vehicle parking agent includes a second instance of some or all of the code and routines that provide the distributed parking fulfillment service. The first instance and the second instance may be the same, similar, or different from one another. In this way, the first processor and the second processor have access to difference instances of this code and routines which collectively, cooperatively, or individually provide the distributed parking fulfillment service when executed by one or more processors. These elements are described in more detail below.

The functionality of the decentralized parking fulfillment system is now introduced according to some embodiments.
Example General Method In some embodiments, the parking lot agent includes code and routines that are operable, when executed by a first processor, to cause the first processor to execute one or more steps of an example general method described herein.

In some embodiments, the vehicle parking agent includes code and routines that are operable, when executed by a second processor, to cause the second processor to execute one or more steps of an example general method described herein.

In some embodiments, the parking lot agent and the vehicle parking agent, collectively or cumulatively, includes code and routines that are operable, when executed by a first processor and a second processor, to cause the first processor and the second processor to execute one or more steps of an example general method described herein.

In some embodiments, the decentralized parking fulfillment system includes code and routines that are operable, when executed by two or more processors, to cause the two or more processors to execute one or more steps of an example general method described herein.

The decentralized parking fulfillment system may be an element of one or more of the following: a connected computing device; and a connected vehicle. As described, the decentralized parking fulfillment system is a distributed system that is distributed across one or more connected computing devices and one or more connected vehicles, but this description is not intended to be limiting.

In some embodiments, the steps of the example general method are executed by two or more of the following: one or more first processors of one or more connected computing devices; and one or more second processors or onboard vehicle computers of one or more connected vehicles. The one or more connected computing devices and the one or more connected vehicles each include their own instances of a communication unit that is operable to send and receive V2X communications.

In some embodiments, one or more connected computing devices and one or more connected vehicle use their respective communicative units to wirelessly communicate with one another via one or more V2X communications (or some other form of wireless message) in order to cooperatively execute one or more steps of the example general method.

V2X data includes digital data that describes the payloads for a V2X communication. The V2X data included in the V2X communications transmitted by the connected computing device 103 include first V2X data. An example of the first V2X data according to some embodiments includes the first V2X data 132. The first V2X data includes, for example, a description of what one or more steps of the example general method or the method 300 will be (or have been) executed by the connected computing device 103 and outcome of these executions. First analysis data includes digital data that describes the outcome of the analysis provided by the parking lot agent while executing the one or more steps of the example general method or the method 300. An example of the first analysis data according to some embodiments includes the first analysis data 181 depicted in FIG. 1. In some embodiments, the first analysis data is an element of the first V2X data. In some embodiments, the first V2X data also includes digital data describe what steps of the example general method or the method 300 should be executed by the vehicle parking agent.

The V2X data included in the V2X communications transmitted by the connected vehicle 123 include second V2X data. An example of the second V2X data according to some embodiments includes the second V2X data 133. The second V2X data includes, for example, a description of what one or more steps of the example general method or the method 300 will be (or have been) executed by the connected vehicle 123 and outcome of these executions. Second analysis data includes digital data that describes the outcome of the analysis provided by the vehicle parking agent while executing the one or more steps of the example general method or the method 300. An example of the second analysis data according to some embodiments includes the second analysis data 188 depicted in FIG. 1. In some embodiments, the second analysis data is an element of the second V2X data. In some embodiments, the second V2X data also includes digital data describe what steps of the example general method or the method 300 should be executed by the parking lot agent.

An example of a communication unit includes the communication unit 145 depicted in FIG. 1. In practice, both the connected computing device 103 and the connected vehicle 123 include their own separate instances of a communication unit 145. See, e.g., FIG. 2A (e.g., an example implementation of the parking lot agent 198 included in a connected computing device 103) and FIG. 2B (e.g., an example implementation of the vehicle parking agent 199 included in a connected vehicle 123).

The parking lot agent 198 includes a first artificial intelligence network. The vehicle parking agent 199 includes a second artificial intelligence network. The first artificial intelligence agent and the second artificial intelligence agent work tother collaboratively to solve a function for identifying whether there is an available parking space in a parking lot whose provision to the connected vehicle would satisfy both the first personalization factors for the operator of the parking lot and the second personalization factors for the operator/driver of the connected vehicle. In some embodiments, the operator/driver of the connected vehicle is the driver 109 of the connected vehicle 123.

First artificial intelligence network data includes digital data that describes the first artificial intelligence network. An example of the first artificial intelligence network data according to some embodiments includes the first artificial intelligence network data 171 depicted in FIG. 1.

Second artificial intelligence network data includes digital data that describes the second artificial intelligence network. An example of the second artificial intelligence network data according to some embodiments includes the second artificial intelligence network data 172 depicted in FIG. 1.

In some embodiments, an artificial intelligence network includes digital data that describes an artificial learning network that is trained to solve the problem of identifying whether a parking lot includes a parking space that is (1) available and (2) whose provision to a particular connected vehicle would satisfy both (3) a threshold number of personalization factors for an operator of a parking lot and (4) a threshold number of personalization factors for an operator/driver of the connected vehicle.

In some embodiments, an artificial intelligence network includes code and routines that is configured to be trained with training data, provide machine learning functionality to the decentralized parking fulfillment system in the provision of the decentralized parking fulfillment service, and evolve and improve its ability to provide the decentralized parking fulfillment service over time by identifying and learning from mistakes.

In some embodiments, the training data for the first artificial intelligence network and the second artificial intelligence network includes the first personalization data 173 and the second personalization data 174 depicted in FIG. 1. In some embodiments, the first artificial intelligence network is also trained with digital data that describes a map of its parking lot and the parking spaces within the parking lot. In some embodiments, the first artificial intelligence network is inputted with sensor data describing the parking lot so that the first artificial intelligence network includes digital data that describes, from the pool of parking spaces within the parking lot, which of these parking spaces are presently available for provision to a connected vehicle.

In some embodiments, the first personalization data 173 includes digital data describing a map of the parking lot 140 and a set of parking spaces 141 within the parking lot. In some embodiments, the parking lot agent 198 uses the lot sensor data 197 to determine which of the set of parking spaces 141 are currently occupiable by a vehicle such as the connected vehicle 123. In some embodiments, the first analysis data 181 includes digital data describing, among other things, the outcome of this determination so that the first analysis data 181 describes which of the set of parking spaces 141 are currently occupiable by a vehicle such as the connected vehicle 123.

In some embodiments, a parking space is available for provision if it is not currently occupied by another vehicle and does not include any qualities that would make it undesirable or unoccupiable as a parking space (e.g., includes a shopping cart of other object within the parking space, is adjacent to another parking space in which the occupying vehicle has parked over the line and encroaches into the otherwise available parking space, includes a pothole, snow mound, or some other defect that would affect the desirability of the parking space or render the parking space not occupiable).

Lot sensor data includes digital data that describes the sensor data measurements taken by the sensors that are included in the parking lot. The sensors include any sensor described herein. An example of a sensor includes one or more of the following: a camera; a lidar sensor; a range-finding sensor; an infrared sensor; an infrared camera; a stereoscopic camera; a sonar device; a radar speed gun; a lidar speed gun; satellite-based imaging devices; and any another type of sensor that is capable of identifying the status of the parking spaces and measuring the status of the personalization factors of the operator of the parking lot. The lot sensor data includes digital data that describes the measurements recorded by any sensor described herein. An example of the lot sensor data according to some embodiments includes the lot sensor data 197 depicted in FIG. 1.

An example of an artificial intelligence network includes a Graph Neural Network. Another example of an artificial intelligence network includes a Neural Network. Yet another example of an artificial intelligence network includes a network configured for Deep Learning (DL). Yet another example of an artificial intelligence network includes a network configured for Reinforcement Learning using Graph Neural Networks (RL-GNN). These examples are not intended to be limiting. The first artificial intelligence network and the second artificial intelligence network can each include any type of artificial intelligence network or any derivative thereof. In some embodiments, the first artificial intelligence network and the second artificial intelligence network use the same type of artificial intelligence network. In some embodiments, the first artificial intelligence network and the second artificial intelligence network include diverse types, models, or architectures of artificial intelligence networks.

In some embodiments, the threshold number is all of the personalization factors. In some embodiments, the threshold number is some of the personalization factors. In some embodiments, the operators of the parking lot and/or the connected vehicle provide an input that sets the threshold. Threshold data includes digital data that describes one or more of the thresholds described herein. An example of the threshold data according to some embodiments includes the threshold data 196 depicted in FIG. 1.

An example of the function includes the function 400 depicted in FIG. 4. Function data includes digital data that describes the function. An example of the function data includes the first function data 182 depicted in FIG. 1. Another example of the function data includes the second function data 183 depicted in FIG. 1.

Personalization data includes digital data that describes the personalization factors (or preferences) of an operator. An operator includes a human or an entity that operates an element such as one of parking lot 140 and the connected vehicle 123. A driver is a human operator of a connected vehicle 123. An example of the driver according to some embodiments includes the driver 109 depicted in FIG. 1. The operator of a parking lot 140 includes a human or legal entity that owns or operates the parking lot 140. For example, the operator of the parking lot 140 is a corporation that owns and operates the parking lot or a city that owns the parking lot which is operated by an individual employed by the city. These examples are intended to be illustrative and not limiting. A parking lot includes an area of land or a parking structure that includes one or more parking spaces 141. A parking space 141 is a portion of a parking lot 140 in which a vehicle such as the connected vehicle 123 may park for a period of time of limited duration.

First personalization data includes digital data that describes the personalization factors of an operator of the parking lot 140. An example of the first personalization data according to some embodiments includes the first personalization data 173 depicted in FIG. 1. An example of the personalization factors described by the first personalization data 173 includes the preferences of the operator of the parking lot 140 for one or more of the following factors: parking space-time availability; vehicle arrival time; vehicle departure times; vehicle attributes (e.g., size, weight, width, length, fossil-fuel powered versus electric); parking accommodation (e.g., handicap, elderly, veteran, etc.); closeness of the parking space to a destination (e.g., the entrance of a building or venue); user parking delay tolerance (e.g., how long it takes for the parking space to become available or accessible); vehicle entry points relative to the parking space; vehicle exit points relative to the parking space; passenger and goods pickup and drop-off points relative to the parking space; parking cost; parking time limits; maximal utilization of parking spaces within the parking lot; traffic fluidity around an inside the parking lot; and any other factors that are relevant to the operator of the parking lot 140.

Second personalization data includes digital data that describes the personalization factors of an operator/driver of the connected vehicle 123. In some embodiments, the operator/driver of the connected vehicle is the driver 109 of the connected vehicle 123. An example of the second personalization data according to some embodiments includes the second personalization data 174 depicted in FIG. 1.

An example of the personalization factors described by the second personalization data 174 includes the preferences of the operator/driver of the connected vehicle 123 for one or more of the following factors: parking space-time availability; vehicle arrival time; vehicle departure times; vehicle attributes (e.g., size, weight, width, length, fossil-fuel powered versus electric); parking accommodation (e.g., handicap, elderly, veteran, etc.); closeness of the parking space to a destination (e.g., the entrance of a building or venue); user parking delay tolerance (e.g., how long it takes for the parking space to become available or accessible); vehicle entry points relative to the parking space; vehicle exit points relative to the parking space; passenger and goods pickup and drop-off points relative to the parking space; parking cost; parking time limits; likelihood of enforcement of parking lot rules; likelihood of being towed or fined for violating parking lot rules; and any other factors that are relevant to the operator/driver of the connected vehicle 123 when selecting a parking lot or parking spot.

Some vehicles are operated by multiple operators. For example, a person may share a connected vehicle 123 with their partner. These different operators may have second personalization data 174 that is different from one another. In these situations, the vehicle parking agent 199 manages different profiles for the different operators and stores different instances of second personalization data 174 for the different profiles, one for each operator. Profile data includes digital data that describes a particular operator and includes their second personalization data 174. An example of the profile data according to some embodiments includes the profile data 184.

Vehicle sensor data includes digital data that describes the sensor measurements recorded by the sensor set 126 of the connected vehicle 123. An example of the vehicle sensor data according to some embodiments includes the vehicle sensor data 195.

System data includes any digital data described herein. An example of the system data according to some embodiments includes the system data 129 depicted in FIG. 1.

When the distributed parking fulfillment system identifies a parking space 141 that satisfies the function, then the distributed parking fulfillment system provides one or more of a notification and routing instructions to the parking space 141 to the operator/driver of the connected vehicle 123 and/or the vehicle control system 153 of the connected vehicle 123. The notification describes the parking space. The routing instructions describe how to get to the parking space from a present geographic location of the connected vehicle 123. The notification data includes digital data that describes the notification (e.g., a graphical display on an electronic display device and/or an audible noise from a speaker). An example of the notification data according to some embodiments includes the notification data 187 depicted in FIG. 1. The routing data includes digital data that describes a driving route to the parking space. The routing data may be provided to the vehicle control system which then automatically drives the connected vehicle 123 to the parking space or displays the driving route on an electronic display of the connected vehicle 123. An example of the routing data according to some embodiments includes the routing data 176 depicted in FIG. 1.

The example general method is now described. In some embodiments, one or more steps of the example general method are skipped or modified. The steps of the example general method may be executed in any order, and not necessarily the order presented.

In some embodiments, a plurality of vehicles on a roadway include instances of the vehicle parking agent. In some embodiments, a plurality of parking lots include connected computing devices including instances of the parking lot agent. In some embodiments, if a first parking lot does not include any available parking spaces that meet the personalization requirements of an operator/driver of a connected vehicle and the operator of the first parking lot, then the decentralized parking fulfillment system identifies a second parking lot and evaluates whether this second parking lot includes an available parking space meets the personalization requirements of the operator/driver of the connected vehicle and an operator of a second parking lot. This process is repeated or repeatable until the decentralized parking fulfillment system identified a parking space that meets the personalization requirements of both the operator/driver of the connected vehicle and an operator of a parking lot.

In some embodiments, the parking lot agents and the vehicle parking agents of these entities collaboratively work together via V2X communications to form a decentralized parking fulfillment system that executes some or all of the steps described below.

In some embodiments, vehicle parking agents and the parking lot agents of these entities collaboratively work together via V2X communications to form a decentralized parking fulfillment system and provide the decentralized parking fulfillment service which is provided by the execution of the example general method described below.

The steps of the example general method are now described according to some embodiments.

Step 1: Execute, by a first processor of the connected computing device (e.g., the first processor 225A depicted n FIG. 2A), a first artificial intelligence network (e.g., the first artificial intelligence network described by the first artificial intelligence network data 171).

Step 2: Execute, by a second processor of the connected vehicle (e.g., the second processor 225B depicted n FIG. 2B), a second artificial intelligence network (e.g., the second artificial intelligence network described by the second artificial intelligence network data 172).

Step 3: Provide the decentralized parking fulfillment service including solving, by the first artificial intelligence network and the second artificial intelligence network, a function (e.g., the function 400 depicted in FIG. 4) that determines a parking space for the connected vehicle 123. In some embodiments, the parking space is within the parking lot that is associated with the connected computing device.

In some embodiments, the connected computing device 103 stores first function data 182 and the connected vehicle 123 stores second function data 183. The first function data 182 and the second function data 183 describe the same function (e.g., the function 400 depicted in FIG. 4). The connected computing device 103 and the connected vehicle 123 communicate with one another via V2X communications. The V2X communications transmitted by the connected computing device 103 include first V2X data 132 within their payload and the V2X communications transmitted by the connected vehicle 123 include second V2X data 133 within their payload.

In some embodiments, the entities (e.g., the connected computing device 103 and the connected vehicle 123) exchange V2X messages that inform one another about their respective personalization data. For example, the connected computing device 103 transmits a first V2X message to the connected vehicle 123 and the first V2X data 132 includes the first personalization data 173. The connected vehicle 123 transmits a second V2X message to the connected computing device 103 and the second V2X data 133 includes the second personalization data 174.

In some embodiments, each of the entities train their artificial intelligence networks using both the first personalization data 173 and the second personalization data 174. Accordingly, the first personalization data 173 and the second personalization data 174 are included in the training data for the artificial intelligence networks. In this way the first artificial intelligence network and the second artificial intelligence network are both trained. In some embodiments, each of the artificial intelligence networks are configured to solve the function using the training data as well as other variables inputted to the artificial intelligence networks. The variables include, for example, the lot sensor data 197 and the vehicle sensor data 195, both of which may be updated on a real-time or periodic basis, shared with the other entity via V2X communication, and inputted anew to the artificial intelligence networks.

As the example general method (or the method 300) are being executed, each entity (e.g., the connected computing device 103 and the connected vehicle 123) executes one or more of the following sub-steps: update the artificial intelligence network with digital data describing variables (e.g., the lot sensor data 197 and the vehicle sensor data 195 which are shared among the entities via V2X communication); execute operations to solve the function; share V2X communications with the other entity about the status of their instance of the function, which steps of the example general method (or method 300) they have executed, and which steps of the example general method (or the method 300) they expect the other entity to execute, whether a parking space has been identified that satisfies the function, and, if the parking space has been identified, what the location is of this parking space relative to the connected vehicle.

In this way, the first artificial intelligence network and the second artificial intelligence network collaborate and work together to solve a function and provide the distributed parking fulfillment service.

Vehicle Control System

In some embodiments, the connected vehicle 123 is an autonomous or semi-autonomous vehicle.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower-level number. The different levels of autonomous vehicles are described briefly below.

Level 0: The vehicle control systems installed in a vehicle have no vehicle control. The vehicle control systems may issue warnings to the driver of the vehicle. A vehicle which is Level 0 is not an autonomous or semi-autonomous vehicle.

Level 1: The driver must be ready to take driving control of the autonomous vehicle at any time. The vehicle control systems installed in the autonomous vehicle may provide autonomous features such as one or more of the following: Adaptive Cruise Control (ACC); and Parking Assistance with automated steering and Lane Keeping Assistance (LKA) Type II, in any combination.

Level 2: The driver is obliged to detect objects and events in the roadway environment and respond if the vehicle control systems installed in the autonomous vehicle fail to respond properly (based on the driver's subjective judgement). The vehicle control systems installed in the autonomous vehicle executes accelerating, braking, and steering. The vehicle control systems installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The vehicle control systems installed in the autonomous vehicle can control the autonomous vehicle in all but a few environments such as severe weather. The driver must enable the automated system (which is comprised of the vehicle control systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the connected vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the vehicle control systems includes one or more of the following ADAS systems: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a LKA system); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or an "ADAS functionality," respectively. The features and functionality provided by these example ADAS systems are also referred to herein as an "autonomous feature" or an "autonomous functionality," respectively.

In some embodiments, reducing an autonomy level of the connected vehicle includes reducing a functionality or degree of driver assistance provided by one or more of the ADAS systems of the connected vehicle. In some embodiments, increasing an autonomy level of the connected vehicle includes increasing a functionality or degree of driver assistance provided by one or more of the ADAS systems of the connected vehicle. In some embodiments, the connected vehicle is sold with only a portion of the ADAS software and/or ADAS hardware enabled. This ADAS software and/or ADAS hardware can be enabled at a later date, for example, in exchange for a fee. In some embodiments, the decentralized parking fulfillment system enables ADAS software and/or ADAS hardware responsive to detecting a medical condition in order to provide increased driving assistance to the driver of the connected vehicle while they are experiencing the medical condition. If all of the installed ADAS software and/or ADAS hardware is enabled, then this is referred to as "maximizing" the available autonomy level of the connected vehicle.

In some embodiments, system data includes some or all of the digital data described herein. In some embodiments, the communication unit of a connected vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit includes some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

As used herein, the term "vehicle" refers to a connected vehicle. A connected vehicle is a conveyance, such as an automobile, which includes a communication unit that enables the conveyance to send and receive wireless messages via one or more vehicular networks. The embodiments described herein are beneficial for both drivers of human-driven vehicles as well as the autonomous driving systems of autonomous vehicles. For example, the decentralized parking fulfillment system improves the performance of a vehicle control system, which benefits the performance of the vehicle itself by enabling it to operate more safety or in a manner that is more satisfactory to a driver 109 of the connected vehicle that is a human.

In some embodiments, the decentralized parking fulfillment system is software installed in an onboard unit (e.g., an electronic control unit (ECU)) of a vehicle having V2X communication capability. The vehicle is a connected vehicle and operates in a roadway environment with N number of remote vehicles that are also connected vehicles.

In some embodiments, the decentralized parking fulfillment system includes code and routines stored on and executed by a cloud server or an edge server.

The connected vehicle and the remote vehicles may be human-driven vehicles, autonomous vehicles, or a combination of human-driven vehicles and autonomous vehicles. In some embodiments, the connected vehicle and the remote vehicles may be equipped with DSRC equipment such as a GPS unit that has lane-level accuracy and a DSRC radio that is capable of transmitting DSRC messages.

Modern vehicles include one or more ADAS systems or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIGS. 1 and 2B.

A particular vehicle that includes these vehicle control systems is referred to herein as an "connected vehicle" and other vehicles in the vicinity of the connected vehicle as "remote vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. A connected vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.).

Vehicles use their onboard sensors and computing resources to execute perception algorithms that inform them about the objects that are in their environment, where these objects are located in their environment, and various measurements about these objects (e.g., speed, heading, path history, etc.).

Cellular Vehicle to Everything (C-V2X)

C-V2X is an optional feature of the embodiments described herein. Some of the embodiments described herein utilize C-V2X communications. Some of the embodiments described herein do not utilize C-V2X communications. For example, the embodiments described herein utilize V2X communications other than C-V2X communications. C-V2X is defined as 3GPP direct communication (PC5) technologies that include LTE-V2X, 5G NR-V2X, and future 3GPP direct communication technologies.

Dedicated Short-Range Communication (DSRC) is now introduced. A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. Although not depicted in FIG. 1, the connected vehicle 123 and the connected computing device 103 each store GPS data. For example, the connected vehicle 123 includes a GPS sensor that determines the GPS location of the connected vehicle 123. The connected computing device 103 includes map data within the first personalization data 173 describing the parking lot 140 and the GPS location of each parking space 141 within the parking lot (e.g., the GPS location of each parking space 141 included in the set of parking spaces included in the parking lot 140).

In some embodiments, the connected vehicle described herein, and depicted in FIG. 1, includes a V2X radio. In these embodiments, all instances of the term "DSRC" as used in this description may be replaced by the term "V2X." For example, the term "DSRC message" is replaced by the term "V2X message," and so on.

75 MHz of the 5.9 GHz band may be designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the vehicle parking agent 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

Vehicular Network

In some embodiments, the decentralized parking fulfillment system utilizes a vehicular network. A vehicular network includes, for example, one or more of the following: V2V; V2X; vehicle-to-network-to-vehicle (V2N2V); vehicle-to-infrastructure (V2I); C-V2X; any derivative or combination of the networks listed herein; and etc.

In some embodiments, the decentralized parking fulfillment system includes software installed in an onboard unit of a connected vehicle. This software is the "vehicle parking agent" described herein.

An example operating environment for the embodiments described herein includes a connected vehicle, one or more remote vehicles (optional), and a connected computing device. The connected vehicle the and the connected computing device have communication units that enable them to send and receive wireless messages via one or more vehicular networks.

Some of the embodiments described herein include a server. However, some of the embodiments described herein do not include a server. A serverless operating environment is an operating environment which includes at least one decentralized parking fulfillment system and does not include a server.

In some embodiments, the decentralized parking fulfillment system includes code and routines that are operable, when executed by a processor of the onboard unit, to cause the processor to execute one or more of the steps of the method 300 depicted in FIG. 3A-3C or any other method described herein (e.g., the example general method).

Example Overview

In some embodiments, the decentralized parking fulfillment system 700 is operable, when executed by a first processor (see, e.g., FIG. 2A) of a connected computing device 103 and a second processor (see, e.g., FIG. 2B) of a connected vehicle 123, to cause the first processor and the second processor to execute code and routines that are operable to provide a distributed parking fulfillment service, an example of which includes the example general method and the method 300 described and depicted with reference to FIGS. 3A-3B, when executed by the first processor and the second processor. An example operating environment 100 for the decentralized parking fulfillment system is depicted in FIG. 1.

In some embodiments, the vehicle parking agent 199 is software installed in an onboard unit (e.g., an electronic control unit (ECU)) of a particular make of vehicle having V2X communication capability. For example, the connected vehicle 123 includes a communication unit 145. The communication unit 145 includes a V2X radio. For example, the communication unit 145 includes a C-V2X radio. FIG. 1 depicts an example operating environment 100 for the vehicle parking agent 199 according to some embodiments.

In some embodiments, the vehicle parking agent 199 and the parking lot agent 198 include the same or similar code and routines with the exception that the first artificial intelligence network built and used by the parking lot agent 198 is biased toward the personalization factors of the operator of the parking lot 140 when solving the function whereas the second artificial intelligence network built and used by the vehicle parking agent 199 is biased toward the personalization factors of the driver 109 of the connected vehicle 123 when solving the function.

Example Operative Environment

Embodiments of the decentralized parking fulfillment system are now described. Referring now to FIG. 1, depicted is a block diagram illustrating an operating environment 100 for a decentralized parking fulfillment system according to some embodiments. The operating environment 100 is present in a roadway environment. In some embodiments, each of the elements of the operating environment 100 is present in the same roadway environment at the same time. In some embodiments, some of the elements of the operating environment 100 are not present in the same roadway environment at the same time.

In some embodiments, the roadway environment includes the parking lot 140. In some embodiments, the connected vehicle 123 is within V2X communication range of the connected computing device 103 but not necessarily present in the parking lot 140. In some embodiments, the connected computing device 103 includes an edge server that is installed in a hardware computing device that is present in the parking lot 140 or within V2X communication range of the parking lot 140.

The parking lot 140 includes objects. Examples of objects include one or of the following: other automobiles, road surfaces; signs, traffic signals, roadway paint, medians, turns, intersections, animals, pedestrians, debris, potholes, accumulated water, accumulated mud, accumulated snow, gravel, roadway construction, cones, payment terminals, guard houses, parking attendant houses, gates, and any other tangible object that is present in a parking lot 140 or otherwise observable or measurable by a camera or some other sensor included in a sensor set.

The operating environment 100 may include one or more of the following elements: a connected vehicle 123 (referred to herein as a "vehicle 123" or an "connected vehicle 123") (which has a driver 109 in embodiments where the connected vehicle 123 is not at least a Level 3 autonomous vehicle, or a human operator that does not drive the connected vehicle 123 in embodiments where the connected vehicle 123 is Level 3 autonomous or greater); and a connected computing device 103. These elements are communicatively coupled to one another via a network 105. These elements of the operating environment 100 are depicted by way of illustration. In practice, the operating environment 100 may include one or more of the elements depicted in FIG. 1. For example, although only one parking lot 140 having one connected computing device 103 are depicted in FIG. 1, in practice the operating environment 100 can include a plurality of these entities.

In some embodiments, the connected vehicle 123 and the connected computing device 103 include similar elements. For example, each of these elements of the operating environment 100 include their own processor 125, bus 121, memory 127, communication unit 145, and sensor set 126. Compare, for example, FIG. 2A (an example embodiment of the connected computing device 103) to FIG. 2B (an example embodiment of the connected vehicle 123). These elements of the connected vehicle 123 and the connected computing device 103 provide the same or similar functionality regardless of whether they are present in the connected vehicle 123 or the connected computing device 103. Accordingly, the descriptions of these elements will not be repeated in this description for each of the connected vehicle 123 and the connected computing device 103.

In the depicted embodiment, one or more of the connected vehicle 123 and connected computing device 103 store similar digital data. The system data 129 includes digital data that describes some or all of the digital data stored in the memory 127 or otherwise described herein. The system data 129 is depicted in FIG. 1 as being an element of the connected computing device 103, but in practice the system data 129 is stored on one or more of connected computing device 103 and the connected vehicle 123.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the connected vehicle 123, as an originating endpoint for each wireless communication transmitted by the network 105. An originating endpoint is the endpoint that initiated a wireless communication using the network 105. In some embodiments, the network 105 is a vehicular network. In some embodiments, the network 105 is a C-V2X network.

In some embodiments, the connected vehicle 123 is a C-V2X equipped vehicles and the connected computing device 103 is a C-V2X equipped device. For example, the connected vehicle 123 includes a standard-compliant GPS unit that is an element of the sensor set 126 and a C-V2X radio that is an element of the communication unit 145. The network 105 may include a C-V2X communication channel shared among the connected vehicle 123 and the connected computing device 103 that also includes its own instances of these elements to enable C-V2X communication with the connected vehicle 123.

A C-V2X radio is hardware radio that includes a C-V2X receiver and a C-V2X transmitter. The C-V2X radio is operable to wirelessly send and receive C-V2X messages on a band that is reserved for C-V2X messages.

The connected vehicle 123 includes a car, a truck, a sports utility vehicle, a bus, a semi-truck, a drone, or any other roadway-based conveyance. In some embodiments, the connected vehicle 123 includes an autonomous vehicle or a semi-autonomous vehicle. Although not depicted in FIG. 1, in some embodiments, the connected vehicle 123 includes an autonomous driving system. The autonomous driving system includes code and routines that provides sufficient autonomous driving features to the connected vehicle 123 to render the connected vehicle 123 an autonomous vehicle or a highly autonomous vehicle. In some embodiments, the connected vehicle 123 is a Level III autonomous vehicle or higher as defined by the National Highway Traffic Safety Administration and the Society of Automotive Engineers. In some embodiments, the vehicle control system 153 is an autonomous driving system. An example embodiment of the autonomous driving system includes the autonomous driving system 252 depicted in FIG. 2B.

The connected vehicle 123 is operable to transmit and receive wireless communications. For example, the connected vehicle 123 is communicatively coupled to the network 105 and operable to send and receive messages via the network 105. For example, the connected vehicle 123 transmits and receives V2X messages via the network 105.

The connected vehicle 123 includes one or more of the following elements: a processor 125; a sensor set 126; a vehicle control system 153; a communication unit 145; an onboard unit 139; a memory 127; and a vehicle parking agent 199. These elements may be communicatively coupled to one another via a bus 121. In some embodiments, the communication unit 145 includes a V2X radio (e.g., a C-V2X radio).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the connected vehicle 123, multiple processors may be included in the connected vehicle 123. The processor 125 may include a graphical processing unit. Other processors, operating systems, sensors, displays, and physical configurations may be possible.

In some embodiments, the processor 125 is an element of a processor-based computing device of the connected vehicle 123. For example, the connected vehicle 123 may include one or more of the following processor-based computing devices and the processor 125 may be an element of one of these devices: an onboard vehicle computer; an electronic control unit; a navigation system; a vehicle control system (e.g., an ADAS system or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the vehicle parking agent 199. In some embodiments, the onboard unit 139 is the computer system 200 depicted in FIG. 2B. In some embodiments, the onboard unit 139 is an electronic control unit (ECU).

The sensor set 126 includes one or more onboard sensors. The sensor set 126 records sensor measurements that describe the connected vehicle 123 and/or the physical environment (e.g., the parking lot 140). The vehicle sensor data 195 includes digital data that describes the sensor measurements.

In some embodiments, the sensor set 126 may include one or more sensors that are operable to measure the physical environment outside of the connected vehicle 123. For example, the sensor set 126 may include cameras, lidar, radar, sonar and other sensors that record one or more physical characteristics of the physical environment that is proximate to the connected vehicle 123.

In some embodiments, the sensor set 126 may include one or more sensors that are operable to measure the physical environment inside a cabin of the connected vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record vehicle sensor data 195. The vehicle sensor data 195 includes digital data that describes images or other measurements of the physical environment such as the conditions, objects, and other vehicles present in the roadway environment. Examples of objects include parking spaces, pedestrians, animals, traffic signs, traffic lights, potholes, obstructions, etc. Examples of conditions include weather conditions, road surface conditions, shadows, leaf cover, snow, or ice on the road surface, any other condition that is measurable by a sensor included in the sensor set 126.

The physical environment may include a roadway region, parking lot, parking structure, or parking garage that is proximate to the connected vehicle 123. As used herein, the term "parking lot" includes a parking structure and a parking garage as well as an uncovered parking lot.

In some embodiments, the roadway environment includes a roadway that includes a roadway region. The vehicle sensor data 195 may describe measurable aspects of the physical environment. In some embodiments, the physical environment is the roadway environment, which itself may include a parking lot. As such, in some embodiments, the roadway environment includes one or more of the following: a roadway region that is proximate to the connected vehicle 123; a parking lot 140 that is proximate to the connected vehicle 123; a parking garage that is proximate to the connected vehicle 123; the conditions present in the physical environment proximate to the connected vehicle 123; the objects present in the physical environment proximate to the connected vehicle 123; and other vehicles present in the physical environment proximate to the connected vehicle 123; any other tangible object that is present in the real-world and proximate to the connected vehicle 123 or otherwise measurable by the sensors of the sensor set 126 or whose presence is determinable from the digital data stored on the memory 127. An item is "proximate to the connected vehicle 123" if it is directly measurable by a sensor of the connected vehicle 123 or its presence is inferable and/or determinable by the vehicle parking agent 199 based on analysis of the vehicle sensor data 195 which is recorded by the connected vehicle 123 and/or the lot sensor data 197 recorded by parking lot sensor set of the connected computing device 103.

In some embodiments, the vehicle sensor data 195 includes digital data that describes all of the sensor measurements recorded by the sensor set 126 of the connected vehicle.

For example, the vehicle sensor data 195 includes, among other things, one or more of the following: lidar data (i.e., depth information) recorded by a connected vehicle; or camera data (i.e., image information) recorded by the connected vehicle. The lidar data includes digital data that describes depth information about a roadway environment (e.g., the parking lot 140) recorded by a lidar sensor of a sensor set 126 included in the connected vehicle 123. The camera data includes digital data that describes the images recorded by a camera of the sensor set 126 included in the connected vehicle 123. The depth information and the images describe the roadway environment, including tangible objects in the roadway environment and any other physical aspects of the roadway environment that are measurable using a depth sensor and/or a camera.

In some embodiments, the sensors of the sensor set 126 are operable to collect vehicle sensor data 195. The sensors of the sensor set 126 include any sensors that are necessary to measure and record the measurements described by the vehicle sensor data 195. In some embodiments, the vehicle sensor data 195 includes any sensor measurements that are necessary to generate the other digital data stored by the memory 127. In some embodiments, the vehicle sensor data 195 includes digital data that describes any sensor measurements that are necessary for the vehicle parking agent 199 and/or the parking lot agent 198 to provide their functionality as described herein with reference to the method 300 depicted in FIG. 3A-3C and/or the example general method described herein.

The vehicle sensor data 195 includes digital data that describes any measurement that is taken by one or more of the sensors of the sensor set 126.

The standard-compliant GPS unit includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes. In some embodiments, the standard-compliant GPS unit is an element of the sensor set 126.

An example of an attribute for GPS data is accuracy. In some embodiments, the standard-compliant GPS unit is operable to generate GPS measurements which are sufficiently accurate to describe the location of the connected vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the connected vehicle 123 is traveling (e.g., the geographic position described by the GPS measurement is accurate to within 1.5 meters of the actual position of the connected vehicle 123 in the real-world). Lane-level accuracy is described in more detail below.

In some embodiments, the standard-compliant GPS unit is compliant with one or more standards governing V2X communications but does not provide GPS measurements that are lane-level accurate.

In some embodiments, the standard-compliant GPS unit includes any hardware and software necessary to make the connected vehicle 123 or the standard-compliant GPS unit compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit is operable to provide GPS data describing the location of the connected vehicle 123 with lane-level accuracy. For example, the connected vehicle 123 is traveling in a lane of a multi-lane roadway. Lane-level accuracy means that the lane of the connected vehicle 123 is described by the GPS data so accurately that a precise lane of travel of the connected vehicle 123 may be accurately determined based on the GPS data for this connected vehicle 123 as provided by the standard-compliant GPS unit.

An example process for generating GPS data describing a geographic location of an object (e.g., a vehicle, a roadway object, an object of interest, the connected vehicle 123, or some other tangible object or construct located in a roadway environment and/or parking lot 140) is now described according to some embodiments. In some embodiments, the vehicle parking agent 199 include code and routines that are operable, when executed by the processor 125, to cause the processor to: analyze (1) GPS data describing the geographic location of the connected vehicle 123 and (2) vehicle sensor data describing the range separating the connected vehicle 123 from an object; and determine, based on this analysis, GPS data describing the location of the object. The GPS data describing the location of the object may also have lane-level accuracy because, for example, it is generated using accurate GPS data of the connected vehicle 123 and accurate sensor data describing information about the object.

In some embodiments, the standard-compliant GPS unit includes hardware that wirelessly communicates with a GPS satellite (or GPS server) to retrieve GPS data that describes the geographic location of the connected vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the connected vehicle 123) are located in adjacent lanes of travel on a roadway. In some embodiments, the standard-compliant GPS unit is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the vehicle parking agent 199 described herein may analyze the GPS data provided by the standard-compliant GPS unit and determine what lane the connected vehicle 123 is traveling in based on the relative positions of two or more different vehicles (one of which is, for example, the connected vehicle 123) traveling on a roadway at the same time.

By comparison to the standard-compliant GPS unit, a conventional GPS unit which is not compliant with the DSRC standard is unable to determine the location of a vehicle (e.g., the connected vehicle 123) with lane-level accuracy. For example, a typical roadway lane is approximately three meters wide. However, a conventional GPS unit only has an accuracy of plus or minus 10 meters relative to the actual location of the connected vehicle 123. As a result, such conventional GPS units are not sufficiently accurate to enable the vehicle parking agent 199 to determine the lane of travel of the connected vehicle 123. This measurement improves the accuracy of the GPS data describing the location of lanes used by the connected vehicle 123 when the vehicle parking agent 199 and/or the parking lot agent 198 are providing their functionality.

In some embodiments, the memory 127 stores two types of GPS data. The first is GPS data of the connected vehicle 123 and the second is GPS data of one or more objects (e.g., one or more parking spaces 141 or some other object in the roadway environment). The GPS data of the connected vehicle 123 is digital data that describes a geographic location of the connected vehicle 123. The GPS data of the objects is digital data that describes a geographic location of an object. One or more of these two types of GPS data may have lane-level accuracy.

In some embodiments, one or more of these two types of GPS data are described by the vehicle sensor data 195. For example, the standard-compliant GPS unit is a sensor included in the sensor set 126 and the GPS data is an example type of vehicle sensor data 195.

The communication unit 145 transmits and receives data to and from a network 105 or to another communication channel. In some embodiments, the communication unit 145 may include a DSRC transmitter, a DSRC receiver and other hardware or software necessary to make the connected vehicle 123 a DSRC-equipped device. In some embodiments, the vehicle parking agent 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 300 depicted in FIG. 3 are transmitted by the C-V2X radio on the upper 30 MHz of the 5.9 GHz band (i.e., 5.895-5.925 GHz) as directed by the vehicle parking agent 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the connected vehicle 123 so that the GPS data for the connected vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the connected vehicle 123 compliant with the DSRC standards or any other wireless communication standard that applies to wireless vehicular communications. In some embodiments, the standard-compliant GPS unit is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the second artificial intelligence network data 172; the second V2X data 133; the second personalization data 174; the second function data 183; the notification data 187; the profile data 184; the vehicle sensor data 195; the routing data 176; the second analysis data 188; and the threshold data 196. Optionally, the memory 127 stores the system data 129. The system data 129 includes some or all of this digital data. In some embodiments, the V2X messages (or C-V2X messages or the set of wireless messages) described herein are also stored in the memory 127.

The above-described elements of the memory 127 were described above, and so, those descriptions will not be repeated here.

Some or all of this digital data can be organized in a data structure that is stored in the memory 127 in some embodiments.

In some embodiments, the connected vehicle 123 includes a vehicle control system 153. A vehicle control system 153 includes one or more ADAS systems or an autonomous driving system.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness decentralized parking fulfillment system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system that is operable to identify one or more factors (e.g., using one or more onboard vehicle sensors) affecting the connected vehicle 123 and modify (or control) the operation of its host vehicle (e.g., the connected vehicle 123) to respond to these identified factors. Generally described, ADAS system functionality includes the process of (1) identifying one or more factors affecting the connected vehicle and (2) modifying the operation of the connected vehicle, or some component of the connected vehicle, based on these identified factors.

For example, an ACC system installed and operational in a connected vehicle may identify that a subject vehicle being followed by the connected vehicle with the cruise control system engaged has increased or decreased its speed. The ACC system may modify the speed of the connected vehicle based on the change in speed of the subject vehicle, and the detection of this change in speed and the modification of the speed of the connected vehicle is an example the ADAS system functionality of the ADAS system.

Similarly, a connected vehicle 123 may have a LKA system installed and operational in a connected vehicle 123 may detect, using one or more external cameras of the connected vehicle 123, an event in which the connected vehicle 123 is near passing a center yellow line which indicates a division of one lane of travel from another lane of travel on a roadway. The LKA system may provide a notification to a driver of the connected vehicle 123 that this event has occurred (e.g., an audible noise or graphical display) or take action to prevent the connected vehicle 123 from actually passing the center yellow line such as making the steering wheel difficult to turn in a direction that would move the connected vehicle over the center yellow line or actually moving the steering wheel so that the connected vehicle 123 is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the connected vehicle 123 to render the connected vehicle 123 an autonomous or semi-autonomous vehicle.

An autonomous driving system includes a set of ADAS systems whose operation render sufficient autonomous functionality to render the connected vehicle 123 an autonomous vehicle (e.g., a Level III autonomous vehicle or higher as defined by the National Highway Traffic Safety Administration and the Society of Automotive Engineers).

In some embodiments, the vehicle parking agent 199 includes code and routines that are operable, when executed by the processor 125, to execute one or more steps of the example general method described herein. In some embodiments, the vehicle parking agent 199 includes code and routines that are operable, when executed by the processor 125, to execute one or more steps of the method 300 described below with reference to FIGS. 3A, 3B, and 3C.

An example embodiment of the vehicle parking agent 199 is depicted in FIG. 2B. This embodiment is described in more detail below.

In some embodiments, the vehicle parking agent 199 is an element of the onboard unit 139 or some other onboard vehicle computer. In some embodiments, the vehicle parking agent 199 includes code and routines that are stored in the memory 127 and executed by the processor 125 or the onboard unit 139. In some embodiments, the vehicle parking agent 199 is an element of an onboard unit of the connected vehicle 123 which executes the vehicle parking agent 199 and controls the operation of the communication unit 145 of the connected vehicle 123 based at least in part on the output from executing the vehicle parking agent 199.

In some embodiments, the vehicle parking agent 199 is implemented using hardware including a field-programmable gate array ("FPGA") or an application-specific integrated circuit ("ASIC"). In some other embodiments, the vehicle parking agent 199 is implemented using a combination of hardware and software.

The roadway environment is now described according to some embodiments. In some embodiments, some, or all of the connected vehicle 123, the parking lot 140, and the connected computing device 103 are located in a roadway environment. The roadway environment is a portion of the real-world that includes a roadway, the connected vehicle 123, the parking lot 140, and the connected computing device 103. The roadway environment may include other elements such as roadway signs, environmental conditions, traffic, etc. The roadway environment includes some or all of the tangible and/or measurable qualities described above with reference to the vehicle sensor data 195 and the lot sensor data 197.

In some embodiments, the roadway environment includes a roadway device (e.g., a roadside unit or some other processor-based computing system) that in includes the connected computing device 103. In some embodiments, the connected computing device 103 is a connected processor-based computing device that includes an instance of the parking lot agent 198 and some of other elements described above with reference to the connected vehicle 123 (e.g., a processor 125, a memory 127 storing the system data 129, a communication unit 145, etc.). An example embodiment of the connected computing device 103 is depicted in FIG. 2A.

In some embodiments, the connected computing device 103 includes one or more of the following elements: an edge server; a cloud server; a hardware server; a personal computer; a laptop; a device such as a roadside unit; or any other processor-based connected device that includes an instance of the vehicle parking agent 199 and a non-transitory memory that stores some or all of the digital data that is depicted in FIG. 1 or otherwise described herein. For example, the memory 127 stores the system data 129. The system data 129 includes some or all of the digital data depicted in FIG. 1 as being stored by the memory 127.

In some embodiments, the connected computing device 103 includes a backbone network. In some embodiments, the connected computing device 103 is operable to provide any other functionality described herein. For example, the connected computing device 103 is operable to execute the parking lot agent 198 which is operable to cause the connected computing device 103 to execute one or more steps of the example general method and/or the method 300 described below with reference to FIGS. 3A, 3B, and 3C. As depicted in FIG. 2A, in some embodiments the connected computing device 103 includes a first processor 225A that is operable to execute the parking lot agent 198 that includes code and routines that are operable to cause the first processor 225A to execute one or more steps of the example general method and/or the method 300 described below with reference to FIGS. 3A, 3B, and 3C.

In some embodiments, the parking lot agent 198 is implemented using hardware including an FPGA or an ASIC. In some other embodiments, the parking lot agent 198 is implemented using a combination of hardware and software.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the vehicle parking agent 199 and the parking lot agent 198 include encryption keys for encrypting wireless messages and decrypting the wireless messages described herein.

Referring now to FIG. 2A, depicted is a block diagram illustrating an example computer system 200 including a parking lot agent 198 according to some embodiments.

In some embodiments, the computer system 200 may include a special-purpose computer system that is programmed to perform one or more of the following: one or more steps of one or more of the method 300 described herein with reference to FIGS. 3A, 3B, and 3C and the example general method described herein.

In some embodiments, the computer system 200 may include a processor-based computing device.

The computer system 200 may include one or more of the following elements according to some examples: the vehicle parking agent 199; a first processor 225A; a first communication unit 245A; a first storage 241A; a first memory 227A; and parking lot sensor set 226. The components of the computer system 200 are communicatively coupled by a bus 220A.

In some embodiments, the computer system 200 includes additional elements such as those depicted in FIG. 1 as elements of the connected vehicle 123.

In the illustrated embodiment, the first processor 225A is communicatively coupled to the bus 220A via a signal line 237A. The first communication unit 245A is communicatively coupled to the bus 220A via a signal line 246A. The first storage 241A is communicatively coupled to the bus 220A via a signal line 242A. The first memory 227A is communicatively coupled to the bus 220A via a signal line 244A. The parking lot sensor set 226 is communicatively coupled to the bus 220A via a signal line 238.

The first processor 225A provides similar functionality as the processor 125 depicted in FIG. 1 and described above. The first memory 227A provides similar functionality as the memory 125 depicted in FIG. 1 and described above. The first communication unit 245A provides similar functionality as the communication unit 145 depicted in FIG. 1 and described above. Accordingly, these descriptions will not be repeated here.

The parking lot sensor set 226 includes any of the sensors described herein. The sensors of the parking lot sensor set 226 are mounted and operable to record lot sensor data 197. In some embodiments, the parking lot sensor set 226 includes one or more of the following sensors: a camera; a lidar sensor; a range-finding sensor; an infrared sensor; an infrared camera; a stereoscopic camera; a sonar device; a radar speed gun; a lidar speed gun; satellite-based imaging devices; a GPS sensor; and any another type of sensor that is capable of identifying the status of the parking spaces and measuring the status of the personalization factors of the operator of the parking lot. The lot sensor data 197 includes digital data that describes the measurements recorded by any sensor described herein.

The first storage 241A can be a non-transitory storage medium that stores data for providing the functionality described herein. The first storage 241A may be a DRAM device, a SRAM device, flash memory, or some other memory devices. In some embodiments, the first storage 241A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the parking lot agent 198 includes code and routines that are operable, when executed by the first processor 225A, to cause the first processor 225A to execute one or more steps of the method 300 described herein with reference to FIGS. 3A, 3B, and 3C. In some embodiments, the parking lot agent 198 includes code and routines that are operable, when executed by the first processor 225A, to cause the first processor 225A to execute one or more steps of the example general method.

In the illustrated embodiment shown in FIG. 2A, the vehicle parking agent 199 includes a first communication module 202A.

The first communication module 202A can be software including routines for handling communications between the parking lot agent 198 and other components of the computer system 200. In some embodiments, the first communication module 202A can be a set of instructions executable by the first processor 225A to provide the functionality described below for handling communications between the parking lot agent 198 and other components of the computer system 200. In some embodiments, the first communication module 202A can be stored in the first memory 227A of the computer system 200 and can be accessible and executable by the first processor 225A. The first communication module 202A may be adapted for cooperation and communication with the first processor 225A and other components of the computer system 200 via signal line 222A.

The first communication module 202A sends and receives data, via the first communication unit 245A, to and from one or more elements of the operating environment 100.

In some embodiments, the first communication module 202A receives data from components of the parking lot agent 198 and stores the data in one or more of the first storage 241A and the first memory 227A.

In some embodiments, the first communication module 202A may handle communications between components of the parking lot agent 198 or the computer system 200.

Referring now to FIG. 2B, depicted is a block diagram illustrating an example computer system 299 including a vehicle parking agent 199 according to some embodiments.

In some embodiments, the computer system 299 may include a special-purpose computer system that is programmed to perform one or more of the following: one or more steps of one or more of the method 300 described herein with reference to FIGS. 3A, 3B, and 3C and the example general method described herein.

In some embodiments, the computer system 299 may include a processor-based computing device. For example, the computer system 299 may include an onboard vehicle computer system of the connected vehicle 123.

The computer system 299 may include one or more of the following elements according to some examples: the vehicle parking agent 199; a second processor 225B; a second communication unit 245B; a vehicle control system 153; a second storage 241B; and a second memory 227B. The components of the computer system 299 are communicatively coupled by a bus 220B.

In some embodiments, the computer system 299 includes additional elements such as those depicted in FIG. 1 as elements of the connected vehicle 123.

In the illustrated embodiment, the second processor 225B is communicatively coupled to the bus 220B via a signal line 237B. The second communication unit 245B is communicatively coupled to the bus 220B via a signal line 246B. The vehicle control system 153 is communicatively coupled to the bus 220B via a signal line 247. The second storage 241B is communicatively coupled to the bus 220B via a signal line 242B. The second memory 227B is communicatively coupled to the bus 220B via a signal line 244B. The sensor set 126 is communicatively coupled to the bus 220B via a signal line 248. The autonomous driving system 252 is communicatively coupled to the bus 220B via a signal line 243. The interface 253 is communicatively coupled to the bus 220B via a signal line 239.

In some embodiments, the sensor set 126 includes standard-compliant GPS unit. In some embodiments, the second communication unit 245B includes a network sniffer.

The second processor 225B provides similar functionality as the processor 125 depicted in FIG. 1 and described above. The second memory 227B provides similar functionality as the memory 125 depicted in FIG. 1 and described above. The second communication unit 245B provides similar functionality as the communication unit 145 depicted in FIG. 1 and described above. Accordingly, these descriptions will not be repeated here.

The following elements of the computer system 299 were described above with reference to FIG. 1, and so, these descriptions will not be repeated here: the vehicle control system 153; the sensor set 126; and the autonomous driving system 252.

The second storage 241B can be a non-transitory storage medium that stores data for providing the functionality described herein. The second storage 241B may be a DRAM device, a SRAM device, flash memory, or some other memory devices. In some embodiments, the second storage 241B also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The interface 253 includes an electronic device to enable the driver or operator/driver of the connected vehicle 123 to communicate with the computer system 299. For example, the interface 253 includes an electronic display device that displays a GUI notifying the driver or the operator about the presence and/or location of an available parking spot. In some embodiments, the notification includes navigation directions to the parking spot. The route data describes the navigation directions. In some embodiments, the interface includes one or more of a speaker, a microphone, a touch screen, a natural language processor, and any other device or software that enables the driver or the operator to communicate with the computer system 299.

In some embodiments, the vehicle parking agent 199 includes code and routines that are operable, when executed by the second processor 225B, to cause the second processor 225B to execute one or more steps of the method 300 described herein with reference to FIGS. 3A, 3B, and 3C. In some embodiments, the vehicle parking agent 199 includes code and routines that are operable, when executed by the second processor 225B, to cause the second processor 225B to execute one or more steps of the example general method.

In the illustrated embodiment shown in FIG. 2B, the vehicle parking agent 199 includes a second communication module 202B.

The second communication module 202B can be software including routines for handling communications between the vehicle parking agent 199 and other components of the computer system 299. In some embodiments, the second communication module 202B can be a set of instructions executable by the second processor 225B to provide the functionality described below for handling communications between the vehicle parking agent 199 and other components of the computer system 299. In some embodiments, the second communication module 202B can be stored in the second memory 227B of the computer system 299 and can be accessible and executable by the second processor 225B. The second communication module 202B may be adapted for cooperation and communication with the second processor 225B and other components of the computer system 299 via signal line 222B.

The second communication module 202B sends and receives data, via the second communication unit 245B, to and from one or more elements of the operating environment 100.

In some embodiments, the second communication module 202B receives data from components of the vehicle parking agent 199 and stores the data in one or more of the second storage 241B and the second memory 227B.

In some embodiments, the second communication module 202B may handle communications between components of the vehicle parking agent 199 or the computer system 299.

Referring now to FIGS. 3A, 3B, and 3C, depicted is a flowchart of an example method 300 according to some embodiments. The method 300 includes step 302, step 304, step 306, step 308, step 310, step 312, step 314, step 316, step 318, step 320, step 322, step 324, and step 326 as depicted in FIGS. 3A, 3B, and 3C. The steps of the method 300 may be executed in any order, and not necessarily those depicted in FIGS. 3A, 3B, and 3C. In some embodiments, one or more of the steps are skipped or modified in ways that are described herein or known or otherwise determinable by those having ordinary skill in the art.

Example differences in technical effect between the methods described herein and the prior art are described below. These examples are illustrative and not exhaustive of the possible differences.

In some embodiments, the distributed parking fulfillment system provides a distributed parking fulfillment service that locates and notifies a connected vehicle about an available parking spaces using two different artificial intelligence networks that are trained with different personalization factors (one is trained to satisfy the personalization factors of a driver of a connected vehicle whereas the other is trained to satisfy the personalization factors of an operator of a parking lot). The prior art does not include a distributed parking fulfillment system that provides a distributed parking fulfillment service that locates and notifies a connected vehicle about an available parking spaces using two different artificial intelligence networks that are trained with different personalization factors.

In some embodiments, the distributed parking fulfillment system provides a distributed parking fulfillment service that locates and notifies a connected vehicle about an available parking spaces using two different artificial intelligence networks that are trained with different personalization factors (one is trained to satisfy the personalization factors of a driver of a connected vehicle whereas the other is trained to satisfy the personalization factors of an operator of a parking lot) to solve a function (e.g., a cost function) that identifies an available parking spot that meets the personalization factors of the driver of the connected vehicle and the operator of the parking lot. The prior art does not include a distributed parking fulfillment system that provides a distributed parking fulfillment service that locates and notifies a connected vehicle about an available parking spaces using two different artificial intelligence networks that are trained with different personalization factors (one is trained to satisfy the personalization factors of a driver of a connected vehicle whereas the other is trained to satisfy the personalization factors of an operator of a parking lot) to solve a function (e.g., a cost function) that identifies an available parking spot that meets the personalization factors of the driver of the connected vehicle and the operator of the parking lot.

In some embodiments, the distributed parking fulfillment system includes a decentralized system (e.g., because the parking lot agent and the vehicle parking agent are components of two different entities) that utilizes two separate neural networks trained with reinforcement learning to search for and fulfill parking spots for a user based on minimizing a cost function that is dependent on the personalization factors of the driver of the connected vehicle and the operator of the parking lot. The prior art does not include a distributed parking fulfillment system includes a decentralized system (e.g., because the parking lot agent and the vehicle parking agent are components of two different entities) that utilizes two separate neural networks trained with reinforcement learning to search for and fulfill parking spots for a user based on minimizing a cost function that is dependent on the personalization factors of the driver of the connected vehicle and the operator of the parking lot.

In some embodiments, the distributed parking fulfillment system provides a distributed parking fulfillment service that locates and notifies a connected vehicle about an available parking spaces that meets the preferences of both an operator of the parking lot and a driver of the connected vehicle wherein those preferences are described by digital data that is inputted to two different artificial intelligence networks that are trained to satisfy the preferences of the operator and the driver using this digital data. The prior art does not include a distributed parking fulfillment system that provides a distributed parking fulfillment service that locates and notifies a connected vehicle about an available parking spaces that meets the preferences of both an operator of the parking lot and a driver of the connected vehicle wherein those preferences are described by digital data that is inputted to two different artificial intelligence networks that are trained to satisfy the preferences of the operator and the driver using this digital data.

These example benefits relative to the prior art are intended to be illustrative and not limiting.

Referring now to FIG. 4, depicted is a block diagram illustrating a function 400 according to some embodiments. In some embodiments, the distributed parking fulfillment service is modeled as an objective function that minimizes the total delays of parking requests while fulfilling as many of them as possible (i.e., minimizing the number abandoned parking requests) with the highest levels of satisfying the personalization factors. In mathematical terms, the goal is to minimize the function 400.

In some embodiments, the function 400 is a cost function. In some embodiments, the goal of the function 400 is to match cost of parking spaces $O_v$ and future requests $W_v$ for every vehicle v.

Figure 5:
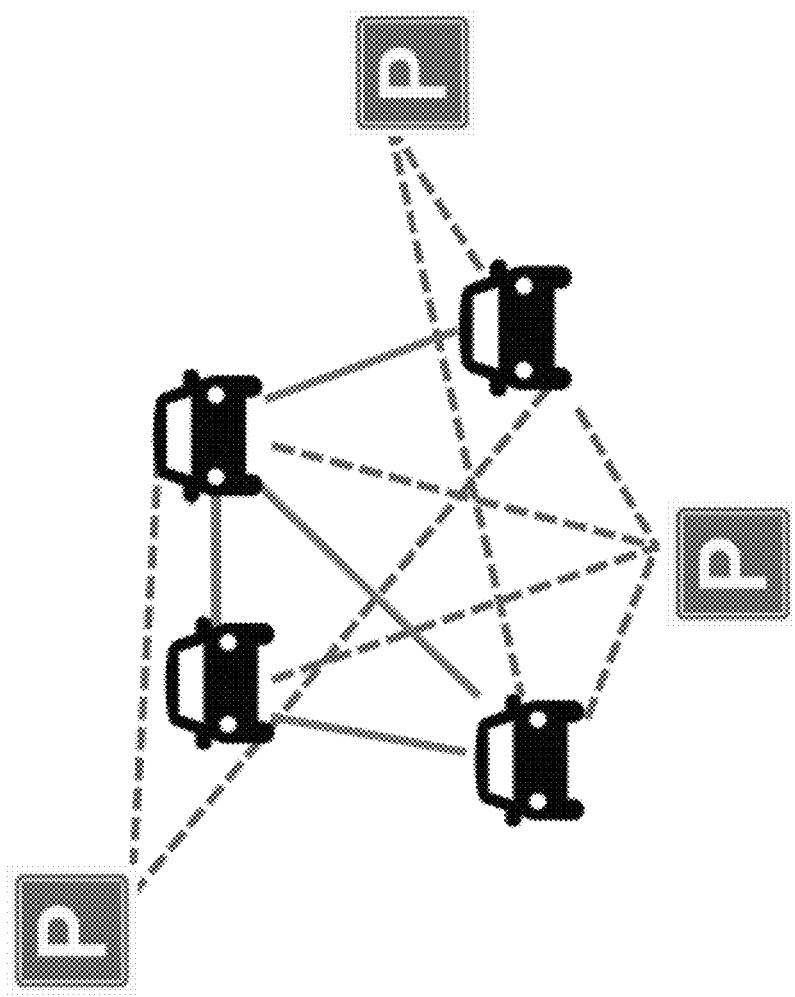
FIG. 5 is a block diagram illustrating an example of a request-parking graph according to some embodiments.

Referring now to FIG. 5, depicted is a block diagram illustrating an example of a request-parking graph 500 according to some embodiments. In some embodiments, the request-parking graph 500 illustrates that the distributed parking fulfillment system provides the distributed parking fulfillment service to multiple connected vehicles and multiple parking lots. In some embodiments, different parking lots coordinate together in parallel to fulfill a single request for a parking space from a connected vehicle. In some embodiments, the method 300 begins by a driver of the connected vehicle using their interface to request a parking space. The request includes the second personalization data for the connected vehicle. A single parking lot agent receives the request and passes the request to other parking lot agents that manage other parking lots. The parking lot agents coordinate with the vehicle parking agent to identify a parking space for that satisfies the request. In some embodiments, each note of the request-parking graph 500 is either a parking lot or a request for a parking space.

Figure 6:
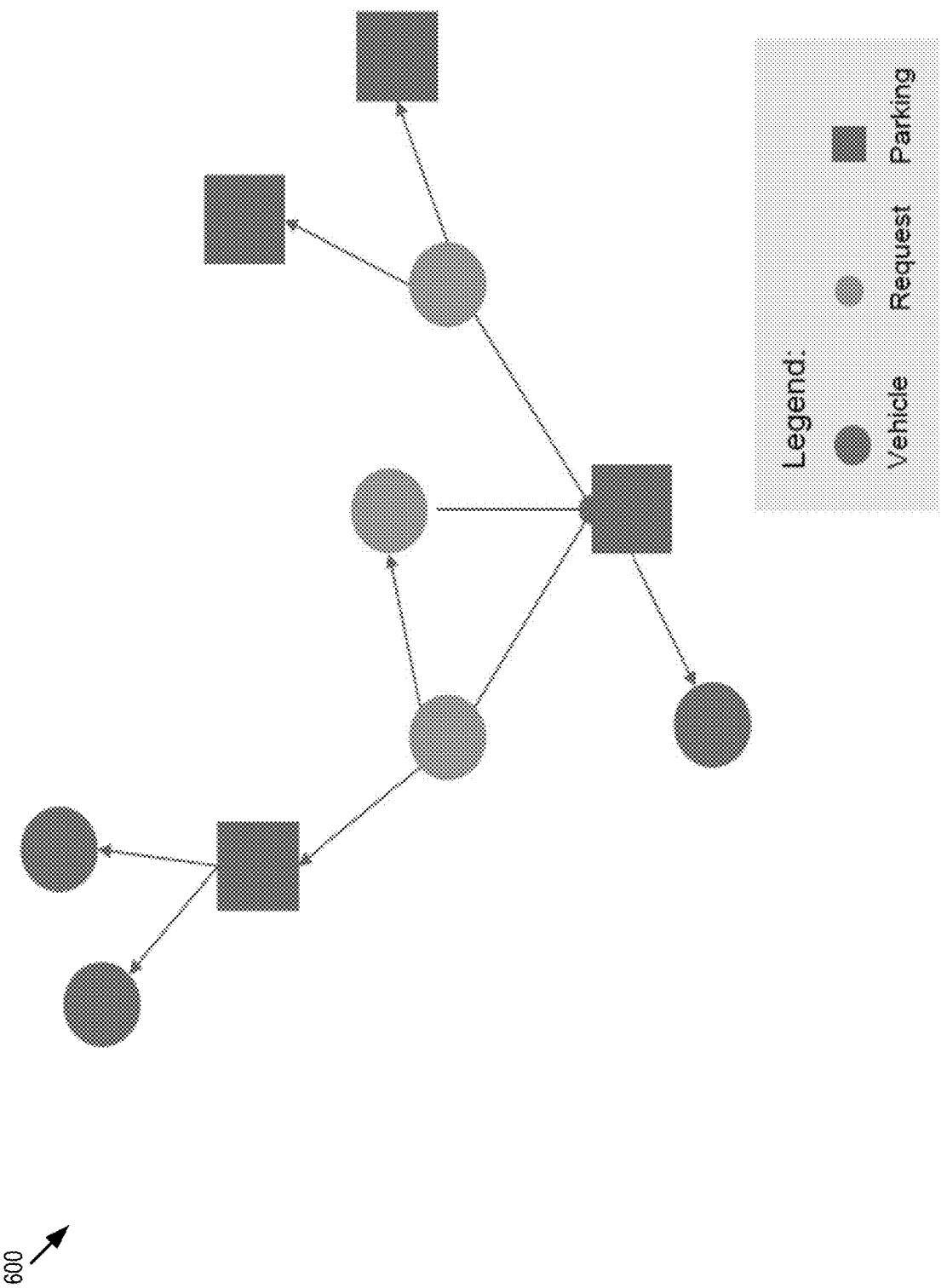
FIG. 6 is a block diagram illustrating an example of a request-parking graph according to some embodiments.

Referring now to FIG. 6, depicted is a block diagram illustrating an example of a request-parking graph 600 according to some embodiments.

Referring now to FIG. 7, depicted is a block diagram illustrating an example of a decentralized parking fulfillment system 700 according to some embodiments.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A decentralized parking fulfillment system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the decentralized parking fulfillment system to become coupled to other decentralized parking fulfillment systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for providing a decentralized parking fulfillment service by a decentralized parking fulfillment system, the method comprising:
    executing, by a first processor of a connected computing device included in the decentralized parking fulfillment system, a first artificial intelligence network whose execution optimizes a function to solve for a first set of first personalization elements that improve an operation of a parking lot;
    executing, by a second processor of a connected vehicle included in the decentralized parking fulfillment system, a second artificial intelligence network whose execution optimizes the function to solve for a second set of personalization elements that benefit a driver of the connected vehicle;
    providing the decentralized parking fulfillment service including solving, by the first artificial intelligence network and the second artificial intelligence network, the function whose solution outputs a parking space for the connected vehicle and wherein the connected computing device and the connected vehicle each store separate instances of the function and output digital data to one another and the first artificial intelligence and the second artificial intelligence communicate to one another their progress solving the function so that the outputted parking space is optimized to the first artificial intelligence and the second artificial intelligence to benefit the driver of the connected vehicle and the operation of the parking lot; and
    autonomously navigating the connected vehicle to the parking space by providing the digital data to an autonomous driving system of the connected vehicle, wherein the autonomous driving system drives the connected vehicle to the parking space based on the digital data.

2. The method of claim 1, wherein the connected computing device includes an edge server.

3. The method of claim 1, wherein the computing device includes a roadside unit.

4. The method of claim 1, wherein one or more of the first intelligence network and the second intelligence network includes a neural network.

5. The method of claim 1, wherein the function includes a cost function.

6. The method of claim 1, further comprising providing a notification to the connected vehicle describing the parking space.

7. The method of claim 1, wherein the first artificial intelligence network is included in a parking lot agent that is operable to solve the function based on a first set of parameters prioritized by an operator of a parking lot that includes the parking space.

8. The method of claim 1, wherein the first artificial intelligence network is stored in a first non-transitory memory of the connected computing device.

9. The method of claim 1, wherein the second artificial intelligence network is included in a vehicle agent that is operable to solve the function based on a second set of parameters prioritized by a driver of the connected vehicle.

10. The method of claim 1, wherein the second artificial intelligence network is stored in a second non-transitory memory of the connected vehicle.

11. The method of claim 1, further comprising the connected computer device and the connected vehicle wireless communicating with one another via wireless communication to solve the function.

12. A non-transitory computer program product stored across a connected computing device and an onboard unit of a connected vehicle that form a decentralized parking fulfillment system, the computer program product including code and routines that are operable, when executed by the onboard unit, to cause a processor of the connected computing device and the onboard unit to execute routines including:
    executing, by the processor included in the decentralized parking fulfillment system, a first artificial intelligence network whose execution optimizes a function to solve for a first set of first personalization elements that improve an operation of a parking lot;
    executing, by the onboard unit included in the decentralized parking fulfillment system, a second artificial intelligence network whose execution optimizes the function to solve for a second set of personalization elements that benefit a driver of the connected vehicle;
    solving, by the first artificial intelligence network and the second artificial intelligence network, the function whose solution outputs a parking space for the connected vehicle and wherein the connected computing device and the connected vehicle each store separate instances of the function and output digital data to one another and the first artificial intelligence and the second artificial intelligence communicate to one another their progress solving the function so that the outputted parking space is optimized to the first artificial intelligence and the second artificial intelligence to benefit the driver of the connected vehicle and the operation of the parking lot;
    providing a notification to the connected vehicle describing the parking space responsive to solving the function; and
    autonomously navigating the connected vehicle to the parking space by providing the digital data to an autonomous driving system of the connected vehicle, wherein the autonomous driving system drives the connected vehicle to the parking space based on the digital data.

13. The non-transitory computer program product of claim 12, wherein the connected computing device includes an edge server.

14. The non-transitory computer program product of claim 12, wherein the computing device includes a roadside unit.

15. The non-transitory computer program product of claim 12, wherein one or more of the first intelligence network and the second intelligence network includes a neural network.

16. The non-transitory computer program product of claim 12, wherein the function includes a cost function.

17. The non-transitory computer program product of claim 12, wherein the notification is provided via an interface of the connected vehicle to a driver of the connected vehicle.

18. The non-transitory computer program product of claim 12, wherein the first artificial intelligence network is included in a parking lot agent that is operable to solve the function based on a first set of parameters prioritized by an operator of a parking lot that includes the parking space.

19. The non-transitory computer program product of claim 12, wherein the second artificial intelligence network is included in a vehicle agent that is operable to solve the function based on a second set of parameters prioritized by a driver of the connected vehicle.

20. A system for providing a decentralized parking fulfillment service by a decentralized parking fulfillment system, the system comprising:
- a first processor of a connected computing device communicatively coupled a first communication unit and a first non-transitory memory, wherein the connected computing device is included in the decentralized parking fulfillment system;
- a second processor of a connected vehicle communicatively coupled to a second communication unit and a second non-transitory memory, wherein the connected vehicle is included in the decentralized parking fulfillment system;
- wherein the first processor is operable to retrieve first computer-executable code from the first non-transitory memory and execute the first computer-executable code;
- wherein the second processor is operable to retrieve second computer-executable code from the second non-transitory memory and execute second computer-executable code;
- wherein the first processor and the second processor are operable to wirelessly communicate with one another during the execution of the first computer-executable code and the second computer-executable code using the first communication unit and the second communication unit so that the first processor and the second processor are communicatively coupled to one another;
- wherein execution of the first computer-executable code and the second computer-executable code is operable to cause the first processor and the second processor to execute steps including:
  - executing, by the first processor, a first artificial intelligence network whose execution optimizes a function to solve for a first set of first personalization elements that improve an operation of a parking lot;
  - executing, by a second processor, a second artificial intelligence network whose execution optimizes the function to solve for a second set of personalization elements that benefit a driver of the connected vehicle;
  - solving, by the first artificial intelligence network and the second artificial intelligence network, a function whose solution outputs a parking space for the connected vehicle and wherein the connected computing device and the connected vehicle each store separate instances of the function and output digital data to one another and the first artificial intelligence and the second artificial intelligence communicate to one another their progress solving the function so that the outputted parking space is optimized to the first artificial intelligence and the second artificial intelligence to benefit the driver of the connected vehicle and the operation of the parking lot; and
  - autonomously navigating the connected vehicle to the parking space by providing the digital data to an autonomous driving system of the connected vehicle, wherein the autonomous driving system drives the connected vehicle to the parking space based on the digital data.

* * * * *